(12) United States Patent
McAlister

(10) Patent No.: US 8,991,182 B2
(45) Date of Patent: Mar. 31, 2015

(54) INCREASING THE EFFICIENCY OF SUPPLEMENTED OCEAN THERMAL ENERGY CONVERSION (SOTEC) SYSTEMS

(75) Inventor: Roy E. McAlister, Phoenix, AZ (US)

(73) Assignee: McAlister Technologies, LLC, Phoenix, AZ (US)

( * ) Notice: Subject to any disclaimer, the term of this patent is extended or adjusted under 35 U.S.C. 154(b) by 646 days.

(21) Appl. No.: 12/857,546

(22) Filed: Aug. 16, 2010

(65) Prior Publication Data

US 2011/0061383 A1    Mar. 17, 2011

Related U.S. Application Data

(63) Continuation-in-part of application No. 12/707,651, filed on Feb. 17, 2010, now Pat. No. 8,075,748, which is a continuation-in-part of application No. PCT/US2010/024497, filed on Feb. 17, 2010, (Continued)

(51) Int. Cl.
| | | |
|---|---|---|
| *F03G 7/04* | (2006.01) | |
| *B60K 16/00* | (2006.01) | |
| *F24J 2/50* | (2006.01) | |
| *F03G 6/00* | (2006.01) | |
| *F03G 7/05* | (2006.01) | |

(52) U.S. Cl.
CPC .. *F03G 6/00* (2013.01); *F03G 7/05* (2013.01); *Y02E 10/34* (2013.01); *Y02E 10/46* (2013.01)
USPC ......... 60/641.7; 60/641.8; 126/567; 126/680; 126/709; 126/711

(58) Field of Classification Search
CPC ............ F03G 7/05; F03G 6/065; F03G 6/067
USPC .............. 60/641.2–641.15; 126/56, 567, 680, 126/704–711
See application file for complete search history.

(56) References Cited

U.S. PATENT DOCUMENTS

| | | | | |
|---|---|---|---|---|
| 4,079,726 A | * | 3/1978 | Voelker | 126/566 |
| 4,170,878 A | * | 10/1979 | Jahnig | 60/641.7 |
| 4,470,403 A | * | 9/1984 | Lin | 126/567 |

(Continued)

FOREIGN PATENT DOCUMENTS

| | | |
|---|---|---|
| CN | 1673527 A | 9/2005 |
| JP | 54034867 | 3/1979 |

(Continued)

OTHER PUBLICATIONS

International Search Report and Written Opinion for PCT Application No. US2010/045670; Date of Mailing: Apr. 15, 2011; 8 pages.

(Continued)

*Primary Examiner* — Hoang Nguyen
(74) *Attorney, Agent, or Firm* — Perkins Coie LLP

(57) ABSTRACT

A system and method for increasing the efficiency of an ocean thermal energy conversion (OTEC) system is described. In some examples, the system collects thermal energy using a solar collector, warms ocean water located within the solar collector, and provides the warmed water to an OTEC system, such as to a vaporizer of a heat engine. In some examples, the OTEC system provides electricity and other energy to another system, creating a cycle of sustainable economic development of energy and resources.

13 Claims, 13 Drawing Sheets

Related U.S. Application Data application No. 12/857,546, which is a continuation-in-part of application No. 12/707,653, filed on Feb. 17, 2010, now Pat. No. 8,172,990, application No. 12/857,546, which is a continuation-in-part of application No. 12/707,656, filed on Feb. 17, 2010, now Pat. No. 8,075,749, and a continuation-in-part of application No. PCT/US2010/024498, filed on Feb. 17, 2010, application No. 12/857,546, which is a continuation-in-part of application No. PCT/US2010/024499, filed on Feb. 17, 2010.

(60) Provisional application No. 61/304,403, filed on Feb. 13, 2010, provisional application No. 61/153,253, filed on Feb. 17, 2009, provisional application No. 61/237,476, filed on Aug. 27, 2009.

(56) References Cited

U.S. PATENT DOCUMENTS

| | | | | | |
|---|---|---|---|---|---|
| 4,513,731 | A | * | 4/1985 | Campbell | 126/646 |
| 5,411,015 | A | * | 5/1995 | Starnes | 126/684 |

FOREIGN PATENT DOCUMENTS

| | | | |
|---|---|---|---|
| JP | 56138468 | | 10/1981 |
| JP | 57091384 | | 6/1982 |
| JP | 57169547 | A * | 10/1982 |
| JP | 59046375 | A * | 3/1984 |
| JP | 59110872 | | 6/1984 |
| JP | 59165873 | | 9/1984 |
| JP | 63021366 | | 1/1988 |
| JP | 02-271080 | | 11/1990 |
| JP | 06061195 | | 3/1994 |
| JP | 8016475 | A | 1/1996 |
| JP | 11-093826 | A | 4/1999 |
| JP | 2005-291112 | A | 10/2005 |
| KR | 950033322 | | 12/1995 |

OTHER PUBLICATIONS

Glandt et al., "Hydrogen Production from Water by Means of Chemical Cycles," Ind. Eng. Chem., Process Des. Dev., vol. 15., No. 1, 1976. 9 pages.

Gregory, D.P., "Hydrogen as a Future Fuel," Institute of Gas Technology, Jun. 1974. 19 pages.

Gregory, D.P., "Hydrogen as a Future Fuel: Testimony to the U.S. House of Representatives Committee on Science and Technology," Institute of Gas Technology, Jun. 25, 1980. 8 pages.

Korean Office Action for Korean Application No. 10-2012-7007661; Date of Mailing: May 9, 2012; 4 pages.

Korean Final Office Action for Korean Application No. 10-2012-7007661; Date of Mailing: Feb. 5, 2013; 3 pages.

Korean Office Action for Korean Application No. 10-2013-7024797; Date of Mailing: Oct. 29, 2013; 19 pages.

* cited by examiner

INCREASING THE EFFICIENCY OF SUPPLEMENTED OCEAN THERMAL ENERGY CONVERSION (SOTEC) SYSTEMS

CROSS-REFERENCE TO RELATED APPLICATION(S)

The present application claims priority to and the benefit of U.S. Provisional Application No. 61/304,403, filed Feb. 13, 2010 and titled FULL SPECTRUM ENERGY AND RESOURCE INDEPENDENCE. The present application is a continuation-in-part of each of the following applications: U.S. patent application Ser. No. 12/707,651, filed Feb. 17, 2010, now U.S. Pat. No. 8,075,748, and titled ELECTROLYTIC CELL AND METHOD OF USE THEREOF; PCT Application No. PCT/US10/24497, filed Feb. 17, 2010 and titled ELECTROLYTIC CELL AND METHOD OF USE THEREOF; U.S. patent application Ser. No. 12/707,653, filed Feb. 17, 2010, now U.S. Pat. No. 8,172,990, and titled APPARATUS AND METHOD FOR CONTROLLING NUCLEATION DURING ELECTROLYSIS; PCT Application No. PCT/US10/24498, filed Feb. 17, 2010 and titled APPARATUS AND METHOD FOR CONTROLLING NUCLEATION DURING ELECTROLYSIS; U.S. patent application Ser. No. 12/707,656, filed Feb. 17, 2010, now U.S. Pat. No. 8,075,749, and titled APPARATUS AND METHOD FOR GAS CAPTURE DURING ELECTROLYSIS; and PCT Application No. PCT/US10/24499, filed Feb. 17, 2010 and titled APPARATUS AND METHOD FOR GAS CAPTURE DURING ELECTROLYSIS; each of which claims priority to and the benefit of the following applications: U.S. Provisional Patent Application No. 61/153,253, filed Feb. 17, 2009 and titled FULL SPECTRUM ENERGY AND RESOURCE INDEPENDENCE; U.S. Provisional Patent Application No. 61/237,476, filed Aug. 27, 2009 and titled ELECTROLYZER AND ENERGY INDEPENDENCE TECHNOLOGIES; U.S. Provisional Application No. 61/304,403, filed Feb. 13, 2010 and titled FULL SPECTRUM ENERGY AND RESOURCE INDEPENDENCE. Each of these applications is incorporated by reference in its entirety.

BACKGROUND

Tropical oceans of the world facilitate operation of giant heat engines between their warm surface waters and their cold deep waters. For example, a typical temperature of the surface waters may be between 25 to 27 degrees Celsius, and a typical temperature of the deep waters temperatures may be between 4 to 6 degrees Celsius. Such temperature differences assist the heat engines in vaporizing and condensing a working fluid, which in turn drives a turbine to produce electricity. Such systems are often referred to as Ocean Thermal Energy Conversion (OTEC) plants or systems.

Unfortunately, there are a number of problems associated with current OTEC systems, including low energy conversion efficiency, a higher cost of operation, and so on. Most ocean locations suitable for conventional OTEC plants are at great distances from population centers and require an expensive and difficult transport mechanism to bring generated energy to market. These extensive infrastructure costs and inherent inefficiencies promote great difficulties in attempts to scale up such operations to meet the world's significant energy needs.

The need exists for systems and methods that overcome the above problems, as well as provide additional benefits. Overall, the examples herein of some prior or related systems and their associated limitations are intended to be illustrative and not exclusive. Other limitations of existing or prior systems will become apparent to those of skill in the art upon reading the following Detailed Description.

DETAILED DESCRIPTION

Figure 1A:
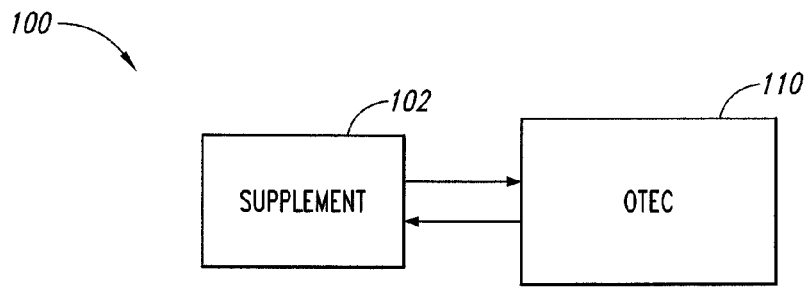
FIG. 1A is a block diagram illustrating a supplemented ocean thermal energy conversion system in accordance with aspects of the disclosure.

The present application incorporates by reference in its entirety the subject matter of U.S. Provisional Patent Application No. 60/626,021, filed Nov. 9, 2004 and titled MULTI-FUEL STORAGE, METERING AND IGNITION SYSTEM. The present application incorporates by reference in their entirety the subject matter of each of the following U.S. patent applications, filed concurrently herewith on Aug. 16, 2010: U.S. patent application Ser. No. 12/806,634, now U.S. Pat. No. 8,441,361, and titled METHODS AND APPARATUSES FOR DETECTION OF PROPERTIES OF FLUID CONVEYANCE SYSTEMS; U.S. Provisional Patent Application No. 61/401,699 and titled COMPREHENSIVE COST MODELING OF AUTOGENOUS SYSTEMS AND PROCESSES FOR THE PRODUCTION OF ENERGY, MATERIAL RESOURCES AND NUTRIENT REGIMES; U.S. patent application Ser. No. 12/806,633, now U.S. Pat. No. 8,075,750, and titled ELECTROLYTIC CELL AND METHOD OF USE THEREOF; U.S. patent application Ser. No. 12/857,553 and titled SUSTAINABLE ECONOMIC DEVELOPMENT THROUGH INTEGRATED PRODUCTION OF RENEWABLE ENERGY, MATERIALS RESOURCES, AND NUTRIENT REGIMES; U.S. patent application Ser. No. 12/857,541 and titled SYSTEMS AND METHODS FOR SUSTAINABLE ECONOMIC DEVELOPMENT THROUGH INTEGRATED FULL SPECTRUM PRODUCTION OF RENEWABLE ENERGY; U.S. patent application Ser. No. 12/857,554, now U.S. Pat. No. 8,808,529, and titled SYSTEMS AND METHODS FOR SUSTAINABLE ECONOMIC DEVELOPMENT THROUGH INTEGRATED FULL SPECTRUM PRODUCTION OF RENEWABLE MATERIAL RESOURCES USING SOLAR THERMAL; U.S. patent application Ser. No. 12/857,228, now U.S. Pat. No. 8,623,107, and titled GAS HYDRATE CONVERSION SYSTEM FOR HARVESTING HYDROCARBON HYDRATE DEPOSITS; U.S. patent application Ser. No. 12/857,515, now U.S. Pat. No. 8,147,599, and titled APPARATUSES AND METHODS FOR STORING AND/OR FILTERING A SUBSTANCE; U.S. patent application Ser. No. 12/857,502 and titled ENERGY SYSTEM FOR DWELLING SUPPORT; U.S. patent application Ser. No. 12/857,433 and titled ENERGY CONVERSION ASSEMBLIES AND ASSOCIATED METHODS OF USE AND MANUFACTURE; and U.S. patent application Ser. No. 12/857,461 and titled INTERNALLY REINFORCED STRUCTURAL COMPOSITES AND ASSOCIATED METHODS OF MANUFACTURING.

Overview

A supplemented ocean thermal energy conversion (SOTEC) system is described. In some embodiments, the system includes a solar collector configured to warm ocean water provided to a heat engine, such as the water provided to a vaporizer. The warmed water enables the vaporizer to vaporize a working fluid and propel a turbine, generating electricity, among other things. Using the solar collector, the system provides water from the surface of the ocean to the heat engine that is at a temperature higher than the water at the surface of the ocean. This causes an increased temperature difference between the water provided to the vaporizer and water from lower areas of the ocean that is provided to a condenser of the heat engine, thereby increasing the efficiency of the thermal energy conversion system, among other benefits. Thus, the system, in some embodiments, provides affordable and dependable energy for sustainable economic development by harnessing solar and other forms of energy to produce electricity, hydrogen, and so on.

In some embodiments, the system may utilize various components of an OTEC system, such as a working fluid, as an energy exchange mechanism between various energy sources and generative systems. The integration of a supplemented OTEC system with other systems allows for various energy sources to increase the efficiency of operation of the OTEC system, and for the OTEC system in turn to increase the efficiency of production of various generative systems. The system, therefore, may realize a sustainable economic benefit of resources found in the world's oceans, among other benefits.

In some embodiments, the SOTEC system provides the following benefits:

The incorporation of objectionable trash components of polymeric materials that are potentially plentiful for construction of sustainable energy conversion systems capable of overcoming the present dependence on fossil fuels;

The utilization of highly durable materials that are potentially plentiful for construction of sustainable energy conversion systems capable of overcoming the present dependence on fossil fuels;

Providing for the economic operation of OTEC plants at locations that are close to coastal population centers;

The reduction of pumping and/or other auxiliary power requirements used in conventional OTEC plants;

The prevention of evaporative cooling of ocean water;

Providing a self-rigidizing structure to prevent evaporation of large areas of ocean water;

Increasing the operating efficiency of OTEC systems by increasing the temperature of ocean water using a solar collector;

Increasing the operating efficiency of OTEC systems by increasing the temperature of ocean water or another working fluid by providing heat addition from solar energy;

Increasing the operating efficiency of OTEC systems by increasing the temperature of ocean water or another working fluid by providing heat addition from another heat engine;

Increasing the operating efficiency of OTEC systems by increasing the temperature of ocean water or another working fluid by providing heat addition from electrochemical processes.

Providing renewable fuels from OTEC operations and distributing the fuels by conventional pipeline networks throughout the continents;

Providing renewable fuels from OTEC operations, storing the fuels in depleted natural gas and oil reservoirs, and distributing the fuels by conventional pipeline networks throughout the continents;

The utilization of thin films and gas insulation assemblies to trap solar energy;

The utilization of barrier layers to reduce evaporative cooling of water in ocean thermal energy conversion technology systems;

Improving the overall efficiency of a heat engine operating according to any thermal cycle in OTEC applications;

The utilization of barrier layers to reduce convective cooling of water in ocean thermal energy conversion technology systems;

The utilization of thin films and gas insulation assemblies to trap solar energy and increase the energy content of working fluids in heat engines receives such solar energy;

Increasing the temperature of water near the surface to improve the efficiency of ocean thermal energy technology systems;

Increasing the temperature of water near the ocean surface to improve the return on investment of ocean thermal energy technology systems;

The utilization of internal combustion engines to supply heat to increase the energy-conversion potential of working fluids used in energy conversion processes;

The utilization of combustion to supply heat to increase the energy conversion potential of gases used in energy conversion processes;

The utilization of external combustion engines to supply heat to increase the kinetic energy of working fluids utilized in ocean thermal energy conversion processes;

The integration of numerous sources of low cost energy during the production of high quality electricity;

The integration of numerous sources of low cost energy for production of high quality hydrogen;

Providing for the rapid production of stored energy;

The production of pipeline quality hydrogen for interchangeable shipment with natural gas in existing and new pipelines;

The production of pipeline quality methane for interchangeable shipment with natural gas in existing and new pipelines;

The creation and generation of economic development and environmental protection benefits from energy conversion processes;

The operation of an electrolyzer as a regenerative system;

The pressurization of fuel delivery by compaction of precursor materials that are gasified to enhance pressure development;

The pressurization of substances by electrolysis;

The pressurization of fuel delivery by energy created by electrolysis;

Providing thermochemical processes in an energy conversion regime;

Providing rugged, failsafe, low-cost conversion of solar energy and/or other energy resources into hydrogen and/or electricity;

The utilization of ubiquitous piston and turbine engines in electricity and hydrogen production systems;

The utilization of hydrogen to transfer heat from rotating electrical equipment;

The utilization of hydrogen to overcome emissions of hydrocarbons;

The utilization of hydrogen to overcome emissions of nitrous compounds from heat engines;

The utilization of hydrogen to overcome emissions of particulates from heat engines;

The utilization of hydrogen to overcome emissions of carbon compounds;

The utilization of hydrogen to improve generator efficiency in hybrid and distributed energy applications; among other utilities and benefits.

Various embodiments of the system will now be described. The following description provides specific details for a thorough understanding and enabling description of these embodiments. One skilled in the art will understand, however, that the system may be practiced without many of these details. Additionally, some well-known structures or functions may not be shown or described in detail, so as to avoid unnecessarily obscuring the relevant description of the various embodiments.

The terminology used in the description presented below is intended to be interpreted in its broadest reasonable manner, even though it is being used in conjunction with a detailed description of certain specific embodiments of the system. Certain terms may even be emphasized below; however, any terminology intended to be interpreted in any restricted manner will be overtly and specifically defined as such in this Detailed Description section.

The Supplemented Ocean Thermal Energy Conversion (SOTEC) System

FIG. 1A is a block diagram illustrating a supplemented ocean thermal energy conversion (SOTEC) system 100. The SOTEC system 100 includes an OTEC system or plant 110 and a supplement 102, such as a supplement of solar energy, heat, resources, other forms of renewable energy, and so on.

In turn, the OTEC system may provide energy, resources, and other benefits to various supplement sources. For example, the OTEC system may provide electricity to an electrolyzer or may provide ammonia to a fuel storage center. Thus, the system may provide a cyclical path of energy and resources that facilitates a sustainable economic development of resources, among other benefits The OTEC system 110 includes various components used to generate electricity and other resources, such as heat engine components, water transport components, and so on. The supplement 102, of which various different forms and configurations will be discussed herein, provides energy to the OTEC system 110 to increase the efficiency of operation of the OTEC system, among other benefits.

In some embodiments, the system enables the sustainable production of hydrogen, carbon, and other resources. In some embodiments, the system harnesses energy during and as a result of the sustainable production of resources. In some embodiments, the system provides for sustainable economic development by refining renewable energy input into the system and, therefore, achieving economic multiplying effects on feedstock, resources, and other substances within the system. Thus, the system is a full-spectrum system for use in ocean and other water-based regions of the world.

Figure 1B:
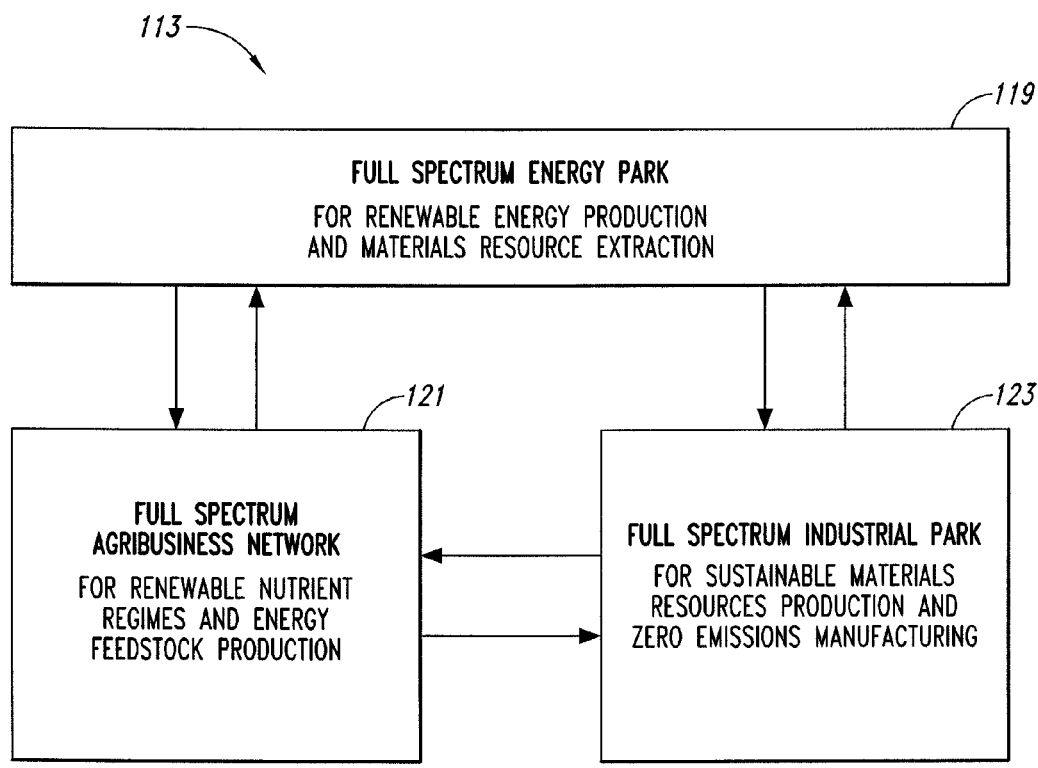
FIG. 1B is a block diagram illustrating an ocean-based full spectrum system in accordance with aspects of the disclosure.

More specifically, FIG. 1B shows the Full Spectrum Integrated Production System 113, composed of three interrelated systems, that include The Full Spectrum Energy Park 119 for Renewable Energy Production and Materials Resource Extraction, The Full Spectrum Agribusiness Network 121 for Renewable Nutrient Regimes (human, animal and plant nutrition) and Energy Feedstock Production (biomass, biowaste and biofuel), and Full Spectrum Industrial Park 123 for Sustainable Materials Resource Production and Zero Emissions Manufacturing.

FIG. 1B shows system 113 as the integration of systems 119, 121, and 123 to enable exchange of energy, materials and information among these systems. System 113 integration, and particularly methods within system 119, utilizes the thermodynamic properties of multiple interrelated heat engines thermally coupled to form a thermodynamic whole-system in order to function effectively as a very large heat engine, which is able to achieve increased beneficial production capacity and efficiency. Within system 113, system 119 is particularly dedicated to achieve synergistic linkage among solar thermal, geothermal, ocean thermal, and engine thermal sources so as to increase the total available renewable energy output of the particular site location, and to provide energy and extracted material resources to systems 121 and 123.

The Full Spectrum Energy Park 119 is thermally coupled to function effectively as a single large heat engine, whose systems and subsystems are interrelated to establish energy cascades, using working fluids that are heated in two or more stages. The total available renewable energy output of system 119 is increased by systematically moving working fluids between solar, geologic, engine, and other thermal sources to achieve a cascade effect to optimize the thermodynamic properties (such as temperature, pressure, purity, phase shift, and efficiency of energy conversion) of a working fluid. Energy output of one stage is re-invested in key processes of another stage so as to operate in a regenerative or autogenous manner with increased efficiency and economy of operation.

Full Spectrum Energy Park 119 functions include: harvesting, conversion and storage of kinetic, thermal, and radiant energy forms among renewable energy sources such as solar, wind, moving water, geothermal, biomass, and internal combustion engines so as to establish autogenous or regenerative energy cascades among the systems to create aggregating and synergistic benefits that cannot be achieved by harvesting, conversion and storage of any one renewal energy source alone. Autogenous or regenerative energy methods are practiced in systems 119, 121, and 123. Further, system 119 is directed to materials resource extraction of numerous chemicals for use in systems 121 and 123. For example, thermochemical regeneration is used as a means of extracting carbon as a raw material (extraction can take place in systems 119, 121 and 123) for subsequent manufacturing production of durable goods at system 123. In another example, thermochemical regeneration can also be used as a means of extracting nitrogen and trace minerals for subsequent manufacturing production of plant fertilizers for use in system 121. Further, system 119 is directed to biowaste, biomass and biofuel conversion, typically to achieve bio-methane gas and/or hydrogen gas storage, transport and use on-demand at systems 119, 121 and 123 as fuels for internal combustion engines and/or fuel cells for electrical power generation and/or transportation.

The manipulation of solar thermal, geothermal, ocean thermal, and engine thermal sources provides a highly adaptive integrated platform for installations of system 113 at various climate regions of location, and installations that are both land-based and ocean-based. Engineering for increased location adaptability thereby significantly increases the total availability of renewable energy harvesting, and thus provides an economically viable solution for local, regional, national and global economies.

Food production at system 121 can be installed on both land and ocean sites. Crop farms, cattle farms, ranches, industrial production facilities for pork and chicken, fresh water fisheries, ocean fisheries, dairy farms, and so on can be linked to system 119 as consumers of the energy produced in system 119, but in turn produce waste by-products which are diverted to system 119 for conversion to renewable energy and renewable materials resources. Further, system 121 is directed to increased Energy Feedstock Production for such biofuel crops, such as algae, switch grass and other crops to increase the viability of photosynthesis-based energy harvesting. Method and apparatus for water production, purification, and conservation are used in each of the systems of production 119, 121 and 123. However, these are important components of system 121 in order to satisfy requirements for large quantities of water in food production and to overcome the documented problem of unsustainability due to waste and fouling of water by conventional food production practices.

System integration increases capacity for "sustainability"—defined as increased production of energy, material resources and nutrient regimes using renewable methods to avoid depletion of natural resources and reduce or eliminate destructive environmental impact such as pollution and toxic emissions as by-products of production. Sustainability requires methods of production for energy, materials, and food that are viable for the long-term wellbeing of future generations, not just the immediate short-term benefit of current consumers.

System integration enables the increase in production capacity for "economic scalability"—defined as significant increase of production of energy, materials, and food that is achieved by the ability to replicate numerous aggregative installation sites, and to increase the number, of available site locations by greatly improved adaptability to the diverse climate regions (i.e., adaptively harvesting renewable energy by accommodating the varied resource characteristics of temperate, tropical and arctic climates). Such economic scalability is required to increase the earth's carrying capacity to sustain continued rapid human population growth, and rapidly increasing energy requirements of developing nations. For successful use, such production methods and locations must be immediately usable, and must present an economically viable alternative to current production means of energy, materials, and food production as compared to using conventional fossil fuel and/or nuclear energy sources.

System integration further enables a zero-emissions and zero-waste method of energy production 119, materials production 123, and food production 121, wherein: organic waste generated in the system 121 that would otherwise be burned, buried, or dumped in landfills, aquifers, streams, oceans, or emitted into the atmosphere as pollutants is instead systematically channeled into biomass, biowaste, and biofuel conversions systems as found in system 119; energy and material resource extraction in system 119 is passed to system 123 for production of durable goods; energy and material resource extraction in system 119 is also passed to system 121 for production of nutrient regimes for humans, animals and plant life on land and ocean.

System integration establishes a single unit of economic production that: intentionally links energy production with food production and materials resource production in such a way that these function as an interdependent whole.

The Full Spectrum Integrated Production System is thus suitable for installation in locations or communities where no comparable renewable energy infrastructure currently exists, or where manufacturing capabilities are deficient and unemployment is the norm, or where food production is deficient and poverty and malnourishment is the norm. The goal of introducing this unified method of economic production is to enable increases in gross domestic product (GDP) with the increased quality of life that accompanies GDP, and systematic job creation with the improved quality of life that accompanies meaningful employment.

Furthermore, system integration establishes a single unit of economic production that intentionally links waste management with energy conversion practices so that they function as an interdependent whole to interrupt conventional waste practices of burn, bury, and dump that lead to pollution and environmental degradation.

The Full Spectrum Integrated Production System introduces use of sustainable waste-to-energy conversion as an integrated practice across the whole system. The goal of this integrated system is to protect the natural environment, conserve finite natural resources, reduce communicable disease, and reduce land, water and air pollution (including reduction in greenhouse gas drivers of climate change, such as methane and CO2).

The Full Spectrum Integrated Production System 113 provides a means to achieve an "industrial ecology," in which the human-systems production environment mimics natural ecosystems: where energy and materials flow among systems and wastes become inputs for new processes in a closed-loop manner, yet the whole system is open to the renewable, sustainable energy provided by sun (solar thermal), earth (geothermal), ocean (ocean thermal), and biomass conversion (engine thermal) systems.

Figure 1C:
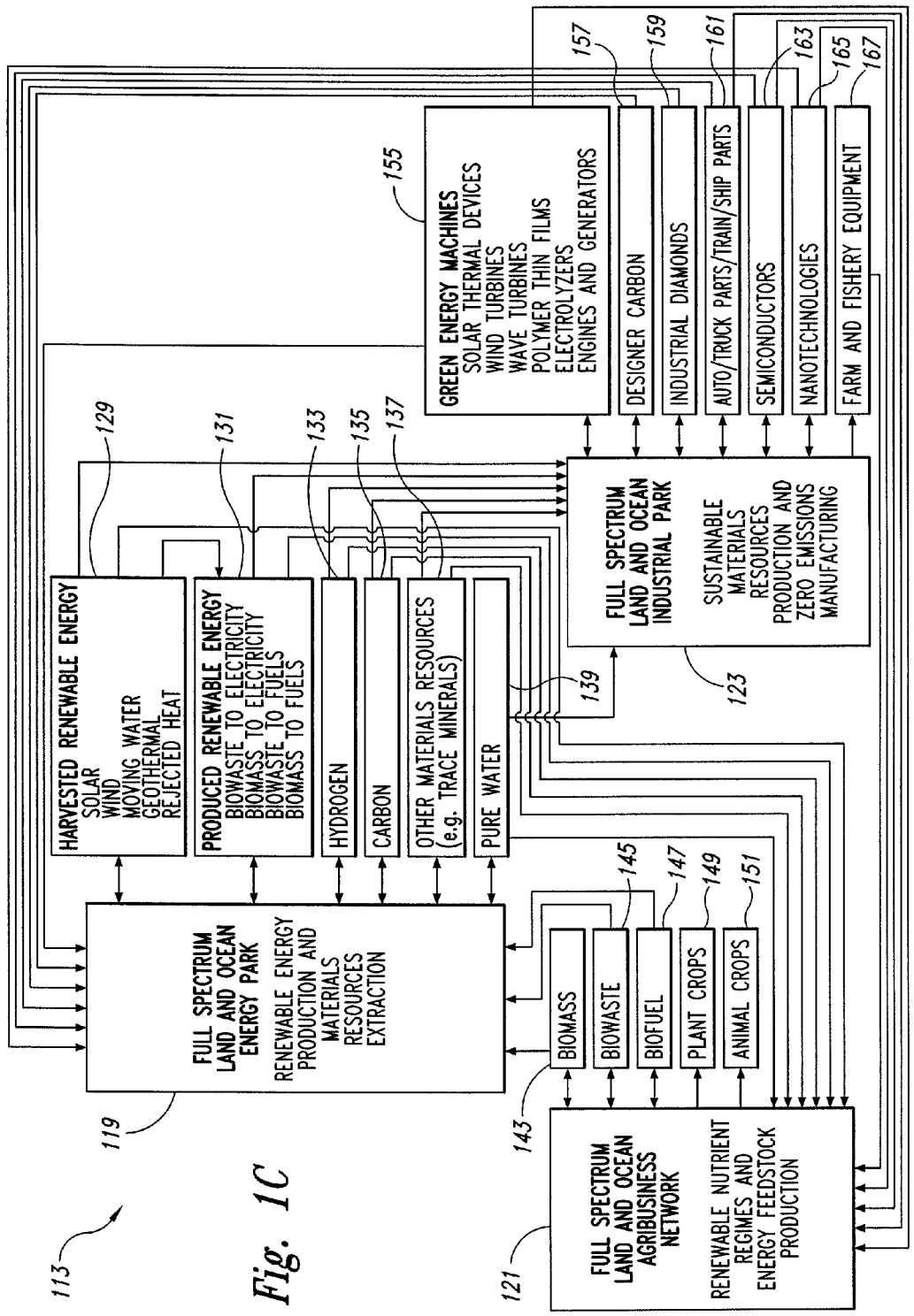
FIG. 1C is a block diagram illustrating a system of integrated production of sustainable economic development in accordance with aspects of the disclosure.

FIG. 1C is a block diagram illustrating components of an ocean-based full spectrum system 113. The full spectrum system 113 includes an energy park 119 for renewable energy production. In some cases, the energy park is an OTEC system. In some cases, the energy park includes renewable energy sources such as solar energy sources, wind energy sources, wave energy sources, geothermal energy sources, engines, biofuel sources, and so on.

The full spectrum system also includes an industrial park 123 for renewable material resources production. In some cases, the industrial park may generate various resources such as carbon, hydrogen, methane, and so on. The full spectrum system also includes an agribusiness network 121 for renewable nutrient regime production, such as sustainable farming, fishing, and ranching.

More specifically, FIG. 1C is a block diagram illustrating a Full Spectrum Integrated Production System 113 of sustainable economic development, which includes the production of energy (e.g., electricity and fuels) concurrent with the production of nutrient regimes (e.g., products for human, animal, or plant nutrition) and the production of materials resources (e.g., hydrogen and carbon). The system 113 is comprised of integrated and interdependent sub-systems with adaptive control of autogenous cascading energy conversions that captures and reinvests some or all of the energy, substances and/or byproducts of each sub-system. Thus, the continued operation of the system 113 is sustained with the introduction of minimal or no external energy or materials resources. The system 113 is an example of industrial ecology which facilitates sustainable economic development, such as the harnessing of renewable energy, the production of foods, and the production of materials resources, which is greater production of energy, foods, and materials resources than is achievable using conventional techniques, among other benefits.

A Full Spectrum Energy Park 119 coordinates methods of capturing energy from renewable sources 129 (e.g., solar, wind, moving water, geothermal, rejected heat) with methods of producing energy from renewable feedstocks 131 (e.g., biowaste 145, biomass 143) and methods of producing materials resources (e.g., hydrogen 133, carbon 135, other materials resources such as trace minerals 137, pure water 139). Energy is stored, retrieved, and transported using methods of adaptive control of autogenous cascading energy conversions that generate a multiplier effect in the production of energy. During the energy harvesting and production processes, materials resources (e.g., hydrogen and carbon) are extracted from biowaste and biomass feedstocks used in the production of renewable energy. The Full Spectrum Energy Park 119 stores, retrieves, transports, monitors, and controls said energy and said resources to achieve improved efficiencies in the production of energy, materials resources, and nutrient regimes.

Some of the produced energy 129, 131 is provided to the Full Spectrum Agribusiness Network 121. Some of the produced energy 129, 131 is provided to the Full Spectrum Industrial Park 123. Some of the produced energy 129, 131 is reinvested in the Full Spectrum Energy Park 119. Some of the produced energy 201, 131 is provided to external recipients and/or added to the national electricity grid and/or the national gas pipeline.

A Full Spectrum Agribusiness Network 121 receives renewable energy produced by the Full Spectrum Energy Park 119 to power the functions of farming, animal husbandry, and fishery sub-systems. This includes renewable fuels for farm equipment, vehicles, boats and ships, and electricity for light, heat, mechanical equipment, and so on.

The Full Spectrum Agribusiness Network 121 receives materials resources and byproducts such as other materials resources (e.g., trace minerals 137) and pure water 139 produced by the Full Spectrum Energy Park 119 to enrich nutrient regimes in farming, animal husbandry, and fishery sub-systems and to produce increased efficiencies in the production of plant crops 149 and animal crops 151.

The Full Spectrum Agribusiness Network 121 harvests energy feedstock and supplies it to the Full Spectrum Energy Park 119 for use in the production of renewable energy. Suitable feedstock includes biomass 143 (e.g., crop slash), biowaste 145 (e.g., sewage, agricultural waste water, meat packing wastes, effluent from fisheries), biofuel stock 147 (e.g., algae, switchgrass), and so on.

A Full Spectrum Industrial Park 123 ruses renewable energy produced by the Full Spectrum Energy Park 119 to power the functions of sustainable materials resources production and zero-emissions manufacturing. This includes renewable fuels for internal combustion engines (e.g., stationary engines, vehicles) and electricity for light, heat, mechanical equipment, and so on.

The Full Spectrum Industrial Park 123 invests materials resources 133, 135 and byproducts 137 received from the Full Spectrum Energy Park 119 to produce additional materials resources (e.g., designer carbon 157 and industrial diamonds 159).

The Full Spectrum Industrial Park 123 uses materials resources and byproducts received from the Full Spectrum Energy Park 119 to manufacture products such as carbon-based green energy machines 155, including solar thermal devices 155, wind turbines 155, water turbines 155, electrolyzers 155, internal combustion engines and generators 155, automobile, ship and truck parts 161, semiconductors 163, nanotechnologies 165, farm and fishery equipment 167, and so on.

The Full Spectrum Industrial Park 123 provides some or all of these products and byproducts to the Full Spectrum Energy Park 119 and the Full Spectrum Agribusiness Network 121.

The Full Spectrum Energy Park 119 uses solar thermal devices 155, wind turbines 155, water turbines 155, electrolyzers 155, internal combustion engines and generators 155, and so on that are produced and provided by the Full Spectrum Industrial Park 123 to produce renewable energy.

The Full Spectrum Agribusiness Network 121 uses internal combustion engines and generators 155, farm and fishery equipment 167 and other devices produced and provided by the Full Spectrum Industrial Park 123 to produce nutrient regimes.

The energy produced by the Full Spectrum Integrated Production System 113 provides power for all the sub-systems, including reinvesting energy to drive the further production of renewable energy. Concurrently, the some or all of the products and byproducts produced in the system 113 are invested in the functions of all the sub-systems. At the same time, the wastes produced by the system 113 are captured and used as feedstock for the functions of all the sub-systems. The integrated and interdependent sub-systems use adaptive controls to manage autogenous cascading energy conversions end autogenous regeneration of materials resources. Thus, the system constantly reinvests renewable energy, sustainable materials resources, and other byproducts into the different sources and processes of the sub-systems (Energy Park, Agribusiness Network, Industrial Park). In this manner, the system 113 harnesses larger amounts of the supplied energy and resource from various resources within the system than is achievable with conventional means. This industrial symbiosis generates a multiplying effect on the amounts of various resources and energy harvested from renewable feedstock and byproduct sources within the system, adding value, reducing costs, and improving the environment, among other benefits.

Figure 1D:
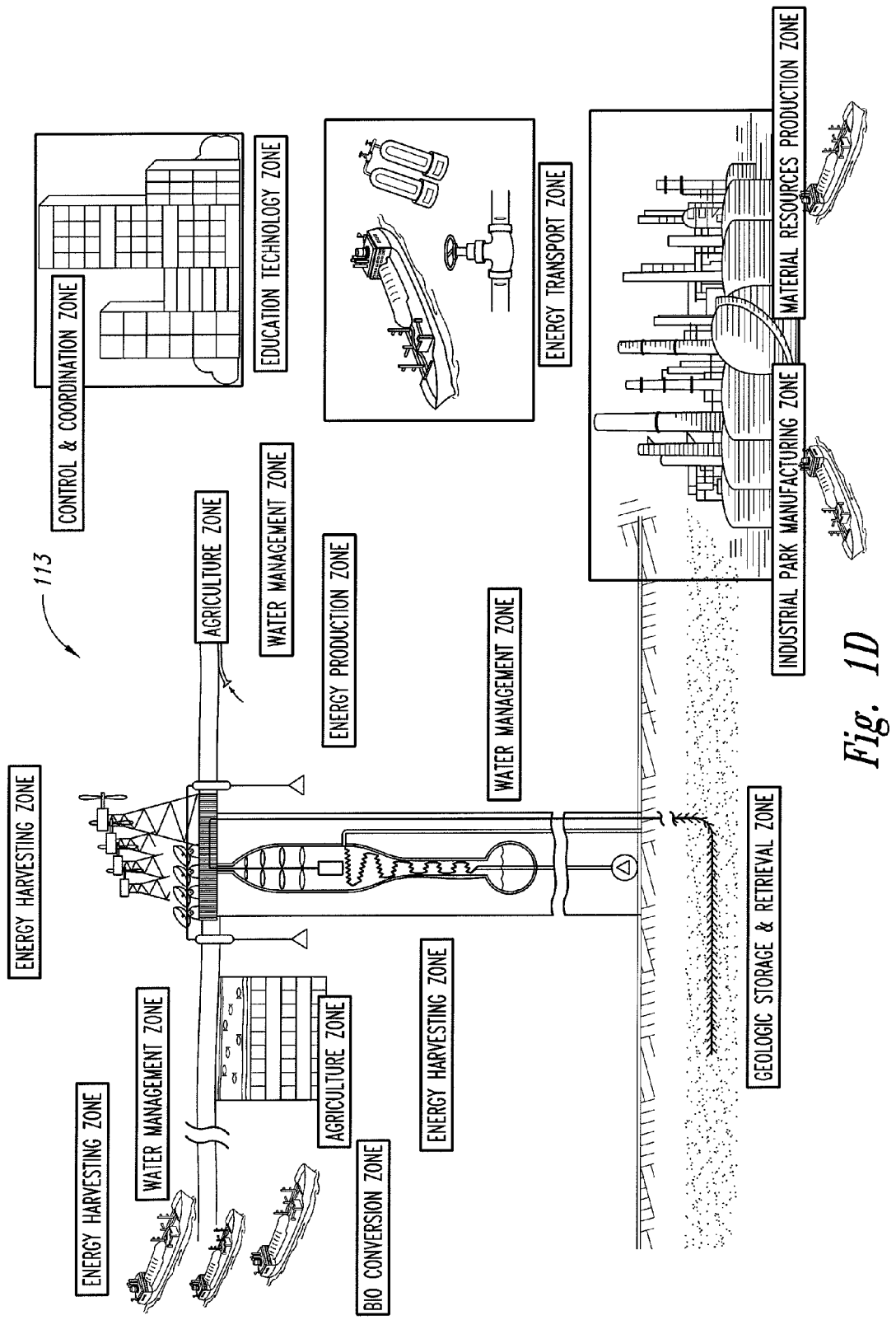
FIG. 1D is a block diagram illustrating an ocean-based system of integrated production of sustainable economic development in accordance with aspects of the disclosure.

FIG. 1D is a schematic illustration of a Full Spectrum Integrated Production System 113 showing various exemplary functional zones for an ocean-based system. The systems shown include an integrated production system on land or ocean with adaptive control of cascading energy conversions and autogenous regeneration of materials resources and production of nutrient regimes. The system includes functional zones for purposes of harvesting and/or generating energy from renewable sources and harvesting material resources from renewable feedstocks that store, retrieve, transport, monitor and control the energy and material resources to achieve improved efficiencies in the production of energy, material resources, and nutrient regimes. Table 1 below expands on exemplary outputs, systems and means associated with the illustrative functional zones.

TABLE 1

Full Spectrum Integrated Production System Functional Zones

| | | |
|---|---|---|
| Full Spectrum Integrated Production System Functional Zones | An integrated production system on land or ocean with adaptive control of cascading energy conversions and autogenous regeneration of materials resources and production of nutrient regimes. The system includes functional zones for purposes of: harvesting and/or generating energy from renewable sources harvesting material resources from renewable feedstocks that stores, retrieves, transports, monitors, and controls said energy and material resources to achieve improved efficiencies in the production of energy, material resources, and nutrient regimes. | |

| Zone | Outputs | Systems and Means |
|---|---|---|
| Energy Harvesting Zone | Harvested renewable energy from sources such as: solar wind, geothermal moving water biomass & biowaste engine thermal rejected heat | solar thermal devices wind turbines moving water turbines heat conversion devices electrolyzers adaptive control of autogenous cascading energy conversions |
| Energy Production Zone | Renewable: electricity gaseous fuels (e.g., hydrogen, methane, CNG) liquid fuels (e.g., methane, biodiesel, HyBoost) energy carrier feedstock | hydrogen-fueled internal combustion engines generators biomass/biowaste conversion systems electrolyzers |
| Geologic Storage and Retrieval Zone | amplification of heat energy in stored gases reclamation of existing chemical and trace mineral resources mitigation of the variability of renewable energy sources (e.g., solar, wind) | geothermal reservoirs wind turbines gas pressurization systems heat conversion devices |
| Energy Transport Zone | Delivery of: scalable on-demand electricity gaseous fuels (e.g., hydrogen, methane, CNG) liquid fuels (e.g., methane, biodiesel, hydrogen-enriched fuel) energy carrier feedstock materials resources feedstock | energy storage and filtration system pressurized hydrogen and other gases hydrogen-fueled trucks, barges, ships, and trains gas pipeline grid electricity grid |
| Biowaste/ Biomass Conversion Zone | energy fuels energy carrier feedstock materials resources feedstock | biodigesters electrolyzers |
| Agricultural Zone | human, animal, and plan nutrition plant crops animal crops biofuel biomass biowaste | Farms and fisheries with: controlled microclimates nutrient regimes such as trace minerals and other materials resources to enrich soil and water water reclamation integrated biomass and biowaste harvesting autogenous regeneration of materials resources from carrier feedstock |
| Material Resources Production Zone | chemical and mineral byproducts (e.g., hydrogen, methane, oxides of carbon, oxides of nitrogen, petrochemicals, ash, nitrogen) additional byproducts (e.g., hydrogen, carbon, designer carbons, oxygen, ammonia, fertilizer, methanol) | |
| Industrial Park Manufacturing Zone | Green machines such as: solar thermal devices wind turbines moving water turbines heat conversion devices electrolyzers polymer thin films engines and generators Other industrial goods: designer carbon industrial diamonds auto, truck, train, & ship parts semiconductors nanotechnologies farm & fishery equipment Consumer durable goods | pre-manufacturing preparation of feedstock materials resources production zero-emissions manufacturing using renewable hydrogen-fueled internal combustion engines (stationary, vehicle) |
| Water Management Zone | water controlled aquatic microclimate for system processes | production of new water purification of water reclamation of water conservation of water heat sink using water adaptive control of water within the system |
| Control and Coordination Zone | Macro coordination of information across zones to achieve task of zero emissions production of energy, material resources and nutrient regimes | embedded sensing devices in all zones computer monitoring and control using the embedded sensing devices automation robotics information/data management at microscopic levels |
| Education Technology Zone | specialized cross-disciplinary skill development of workforce job creation at each | integrated training in cross-disciplinary fields application, monitoring, and performance |

TABLE 1-continued

| installation site new kinds of energy sector jobs appropriate to integrated renewable energy production, renewable material resource production, and renewable nutrient regime production | support in the Full Spectrum Integrated Production System environment |
|---|---|

Figure 1E:
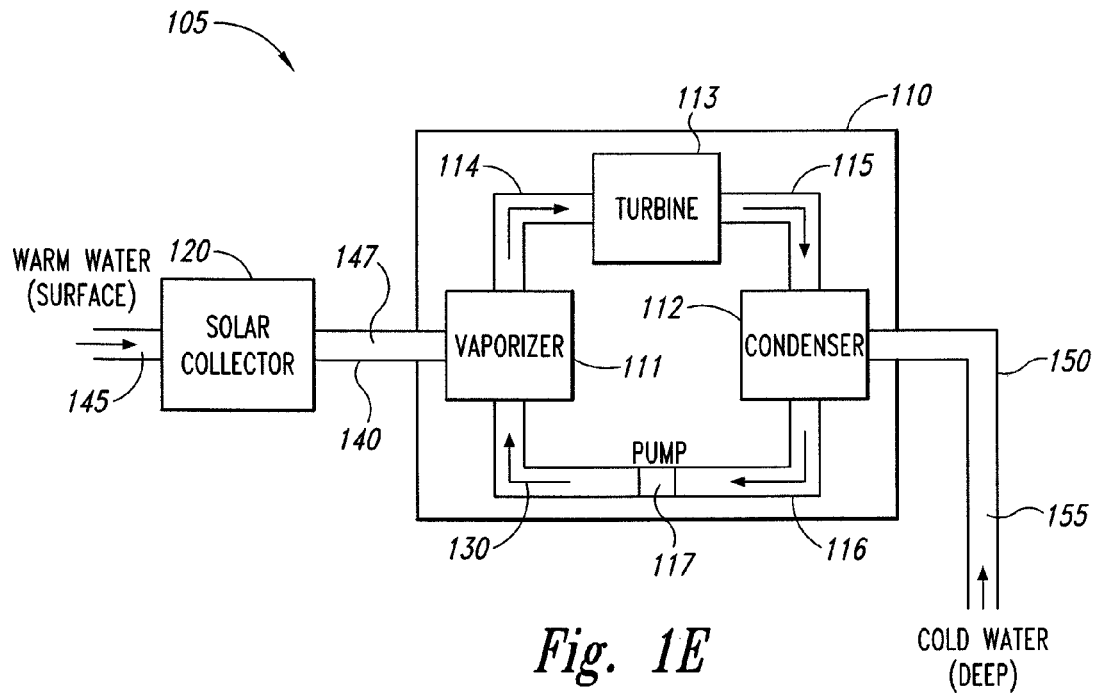
FIG. 1E is a block diagram illustrating a solar ocean thermal energy conversion system in accordance with aspects of the disclosure.

In some embodiments, the supplement 102 is an assembly capable of generating and providing heat captured from solar energy to an OTEC plant 110. FIG. 1E is a block diagram 105 illustrating a supplemented ocean thermal energy conversion system using solar energy as the supplement 102.

An OTEC plant 110 includes a vaporizer 111, a condenser 112, a turbine 113, conduits 114, 115, 116 that contain and transport a working fluid 130 to/from the other components, and an optional pump 117 that moves the working fluid from the condenser to the vaporizer. The OTEC plant 110 also includes a surface water inlet pipe 140 that transports relatively warm water 145 from the ocean surface into the vaporizer 111, and a deep water inlet pipe 150 that transports relatively cold water 155 from the depths of the ocean into the condenser 112.

A solar collector 120 is coupled to the surface water inlet pipe 140. The solar collector 120 receives the surface water 145, warms the surface water to a higher temperature, and provides the warmer water 147 to the vaporizer 111 of the OTEC system 110. Thus, the OTEC system 110, being supplemented with water warmed using a solar collector, operates at an increased efficiency with respect to non-supplemented, conventional OTEC systems, among other benefits.

Figure 2:
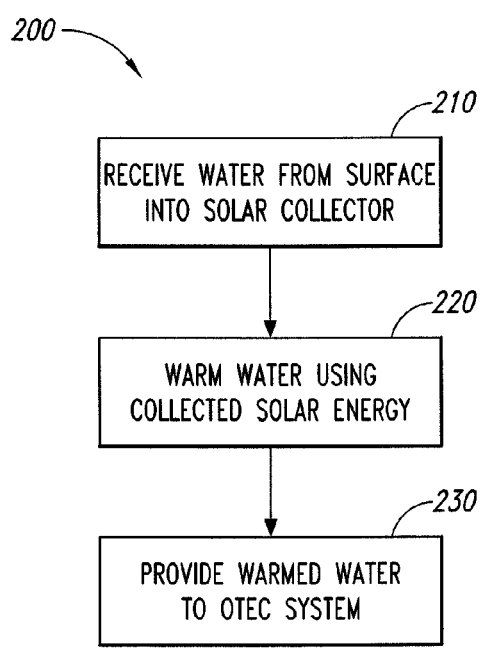
FIG. 2 is a flow diagram illustrating a routine for increasing the efficiency of an ocean thermal energy conversion system in accordance with aspects of the disclosure.

FIG. 2 is a flow diagram illustrating a process 200 for increasing the efficiency of an ocean thermal energy conversion system. In step 210, a solar collector receives water from a surface of the ocean. In step 220, the solar collector warms the received water. In step 230, the solar collector provides the warmed water to an OTEC system. For example, the solar collector provides the warmed water to a vaporizer operating as part of a heat engine within the OTEC system.

In a typical OTEC system, the Carnot efficiency limit is about 6.7% for operation, given surface water temperatures of 25 to 27 degrees C. and deep water temperatures at about 5 degrees Celsius. Providing a supplement to an OTEC system can improve the overall efficiency, regardless of the type of heat engine and/or chosen thermal cycle. In some cases, the supplement can improve the efficiency of an OTEC system operating a Rankine cycle with a working fluid of ammonia, halogenated hydrocarbons, propane and/or hydrocarbon mixtures. In some cases, the supplement can improve the efficiency of an OTEC system having a "Claude" type of operation, in which water vapor is flashed from warm surface conditions into a vacuum and expanded across an expander to produce work, before being condensed by heat exchange with cold water from the depths of the ocean. In some cases, the supplement can improve the efficiency of an OTEC system using mist lift systems, such as two-stage mist lift systems.

Solar Collector Assemblies

Figure 3:
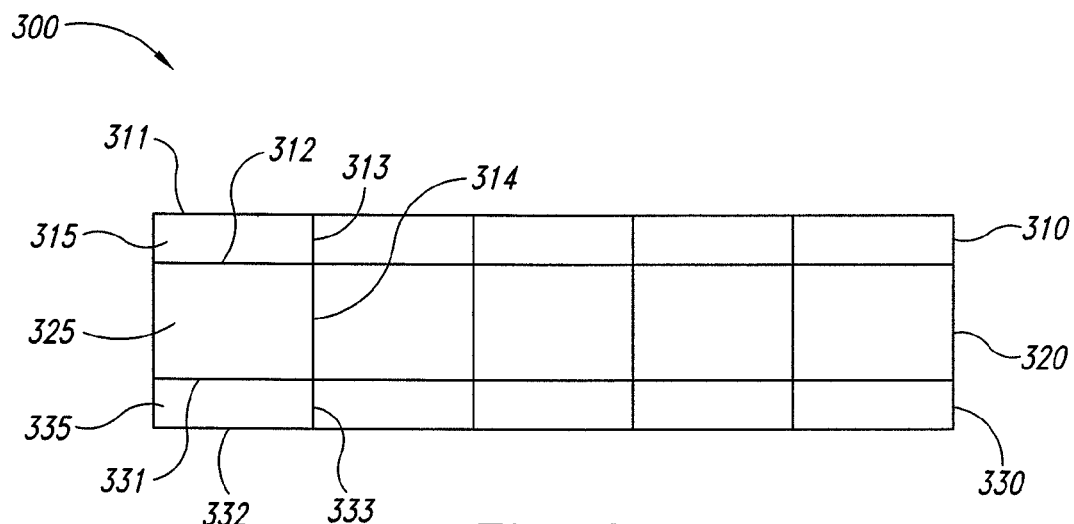
FIG. 3 is a schematic diagram illustrating an end view of a sectioned solar collector assembly in accordance with aspects of the disclosure.

As discussed herein, in some embodiments the system utilizes solar collector assemblies to trap or capture solar energy in order to heat ocean surface water before providing the water to an OTEC plant. FIG. 3 is a schematic diagram illustrating an end view 300 of a sectioned solar collector assembly 300. The assembly 300 includes a web of polymer based walls, including a top wall 311, side wall 313, and bottom wall 312 forming a top section 310 having an insulating air space 315 and a top wall 331, side wall 333, and bottom wall 332 forming a bottom section 330 having an insulating air space 335. The relatively thin polymer walls and/or spaces formed by the walls trap solar energy. The trapped solar energy heats water contained by channel 320 in sub-channels 325 formed by the walls 312, 331, and 314. The trapped solar energy also prevents evaporative cooling of water contained by the channel 320. The channel 320 enables the assembly 300 to receive water from the ocean, store the water in the assembly, heat the water in the assembly, and transport the water to a destination, such as a heat engine that is part of an ocean thermal energy conversion system.

The solar collector assembly 300 may be weld-fabricated using large rolls of sheet stock, or extruded and/or extrusion blow-molded as an integral assembly with the insulating air space(s) formed by various walls. Current polymer technology provides thin films that are strong, of low gas and moisture permeability, low cost, and capable of being tailored for applications such as the high volume production of "bubble pack" and other types of packaging.

In some cases, the solar collector assembly 300 may utilize such materials in manufacturing "clear" or relatively transparent walls used to transmit the full spectrum (i.e. all wavelengths) of energy received from the sun to water stored in or transported by the channel 325. In some cases, the solar collector assembly 300 may utilize clear or transparent materials for walls 311, 312, and utilize dark or opaque materials (e.g., carbon microcrystals) for other walls, such as walls 332, 314. Further details regarding the use of various materials in manufacturing opaque walls may be found in related copending applications referenced and incorporated above. The selective use of materials having different light transmission properties and characteristics allows the assembly 300 to conductively and/or radiatively heat water passing through the channel 315 to high temperatures, such as temperatures of 30-45 degrees C. Of course, other factors may contribute to realized temperatures, such as the velocity of the water, the surrounding wind chill, the currents in the ocean, the available solar energy (insolation), and so on.

Warming and providing water at such temperatures can increase the operation efficiency of the OTEC system, as described above. For example, using a suitable thermodynamic cycle with heat rejections at deep water temperatures of 4-6 degrees C., providing ocean water at a temperature of 35 degrees C. improves the Carnot efficiency limit from 6.7% to about 9.7%, and heating the ocean water to 45 degrees C. improves the Carnot efficiency limit to about 12.6%.

Practical OTEC systems, however, have undesirable temperature drops, equipment losses due to wind and friction, and inherent requirements to use a portion of output energy to drive pumps and other auxiliary components. These factors generally reduce the actual thermal efficiency of OTEC systems utilizing surface ocean water at 25-27 degrees C. to about 3%. However, increasing the temperature of the surface water using a solar collector, such as solar collector 300, to 35 degrees C. increases the practical efficiency from 3% to 6%, and increasing the temperature of the surface water using the solar collector to 45 degrees C. can increase the practical efficiency to about 9%, or three times the practical efficiency of conventional OTEC power plants. Such improvements in efficiency realize faster payback of initial OTEC plant costs along with far lower production costs for renewable energy, and other benefits.

In some cases, the solar collector assembly 300 is fabricated using polymer films with air cells similar to those in "bubble-pack" assemblies. In some cases, the solar collector assembly 300 is extruded from a barge or ship using an extrusion die pressure fed by an extruder to convert transparent polymer feed stock, such as pellets, into the walls 311, 312, while another extruder delivers black polymer feed stock to convert the feed stock into the walls 314, 331, 332. Such fabrication techniques facilitate large solar collector lengths (e.g. 1-10 miles) or other specific lengths necessary for collection of specific energy levels needed by an OTEC plant.

Figure 4:
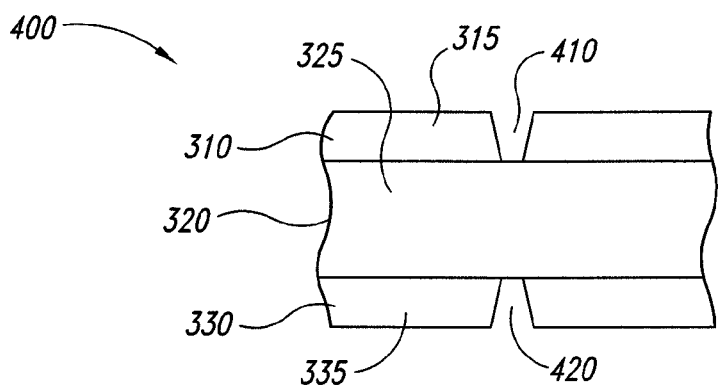
FIG. 4 is a schematic diagram illustrating a side view of a solar collector assembly having closed air cells in accordance with aspects of the disclosure.

FIG. 4 is a schematic diagram illustrating a side view 400 of a solar collector assembly having closed air cells. The solar collector assembly includes a channel 320 and insulating spaces 310 and 330. Closures or depressions 410 and 420 are formed on the insulating spaces. For example, deforming and welding walls together creates the depressions and a panel assembly that floats on water. The depressions may be covered with a thin plastic strip (not shown) to create smooth surfaces on the top and bottom of the solar collector assembly. The depressions may be used to hold suitable stiffeners and/or weights to lower the center of gravity of the assembly.

Figure 5:
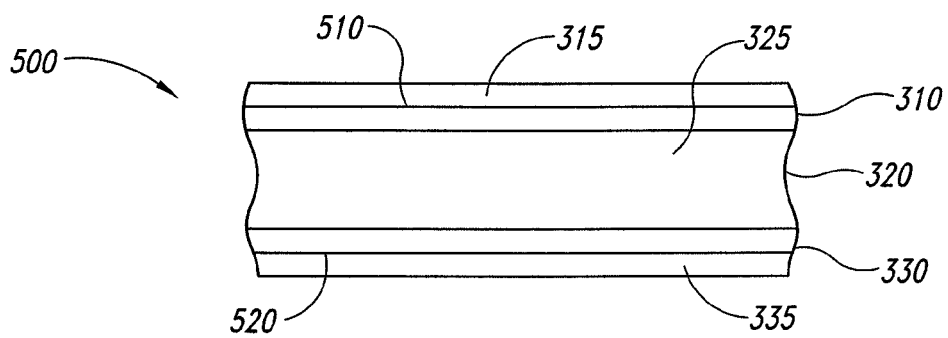
FIG. 5 is a schematic diagram illustrating a side view of a solar collector having a web within the insulating spaces in accordance with aspects of the disclosure.

In some embodiments, the solar collector assembly may overcome or prevent convective current losses by adding a horizontal web 510, 520 to the insulating spaces 310, 330. FIG. 5 is a schematic diagram illustrating a side view 500 of a solar collector having a web 510 within the insulating spaces. The web 510, 520 provides an additional layer or wall in which to contain heat within the insulating spaces and/or within the channel 320. The web 510, 520 may be within one or both spaces, and may be fabricated from clear or opaque materials, depending on the needs of an OTEC system.

Figure 6A:
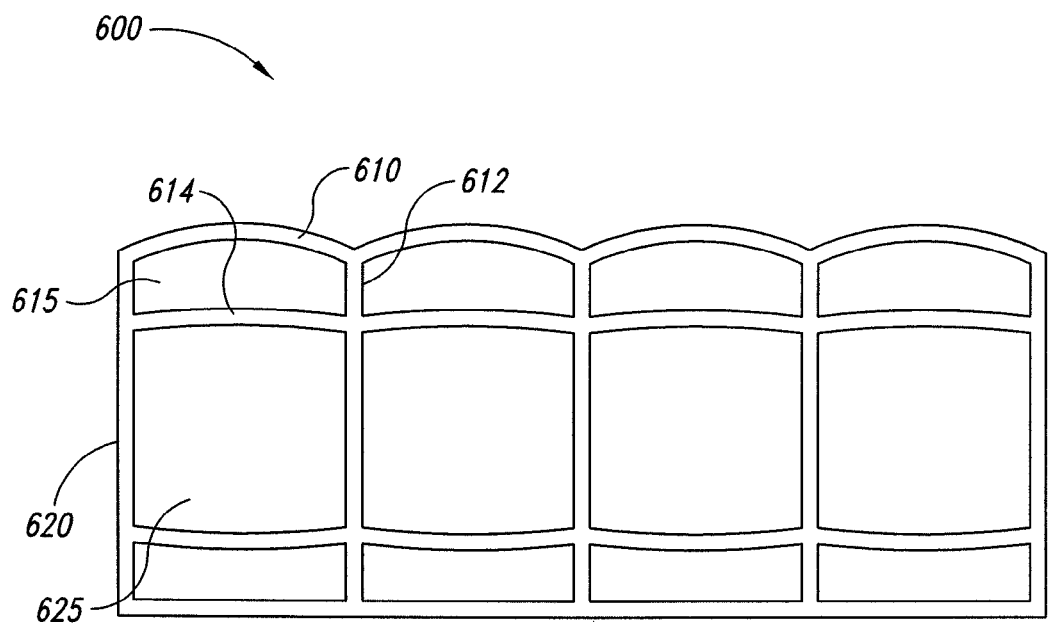
FIG. 6A is a schematic diagram illustrating an end view of a sectioned solar collector assembly having linear lenses in accordance with aspects of the disclosure.

FIG. 6A is a schematic diagram illustrating an end view of a sectioned solar collector assembly 600 having linear lenses. The assembly 600 includes lenses 610 having insulating spaces formed from walls 612, 614, 620, and the lenses, and a channel 625 that stores ocean water and receives the heat captured by the insulating spaces 615. The lenses 610 refract and collect early morning and/or late afternoon sunlight that would normally reflect from flatter walls of an assembly. The lens, in some cases, provide a better daily conversion of solar energy to heat, and provide trussing of the assembly to improve the strength and rigidity of the assembly, among other benefits.

Some of the lenses 610 and walls 612, 614, 620 may be fabricated of material that transmits the entire solar spectrum, while other lenses may be fabricated of material that transmits infrared wavelengths corresponding to 50 degrees C. or cooler. For example, the walls may be opaque in order to convert solar radiation into heat, which warms water passing through the channel 625. The air in space 615 insulates the warm water in the channel 625. Applying a coating to the walls 612, 614, 620 allows for refection of infrared wavelengths to 50 degrees C. or cooler.

In some embodiments, a solar collector assembly may overcome or prevent convective current losses by filling the insulating spaces with a gas having a lower thermal conductivity than air. Table 1 shows the relative thermal conductivity of gases suitable for filling the insulating spaces.

TABLE 1

| SUBSTANCE | THERMAL CONDUCTIVITY | |
|---|---|---|
| AIR | 0.026(W/mKsec) | (100%) |
| Ar (Argon) | 0.018 | (69%) |
| CO (Carbon Monoxide) | 0.025 | (96%) |
| $CO_2$ (Carbon Dioxide) | 0.017 | (65%) |
| He (Helium) | 0.151 | (580%) |

TABLE 1-continued

| SUBSTANCE | THERMAL CONDUCTIVITY | |
|---|---|---|
| $H_2$ (Hydrogen) | 0.182 | (700%) |
| Ne (Neon) | 0.049 | (188%) |
| $N_2$ (Nitrogen) | 0.026 | (100%) |
| $O_2$ (Oxygen) | 0.027 | (104%) |
| $C_3H_8$ (Propane) | 0.016 | (63%) |
| $H_2O$ (Water) | 0.59 | (2300%) |

For example, carbon dioxide and argon offer a much lower thermal conductivity than air, and provide a greater insulation to the warm water in the channel. Also, some selected gases, such as carbon dioxide, sulfur hexafluoride, or an oxide of nitrogen, may also block or inhibit the loss of heat by IR radiation from the heated water.

In some cases, the solar collector assembly may include pressurized insulating spaces to strengthen or rigidize the solar collector assembly. In some cases, the solar collector assembly may be fabricated from low permeability materials or composite layers or surface treatments to hold air or other less-conductive gases under various desirable pressures within the insulating spaces.

Figure 6B:
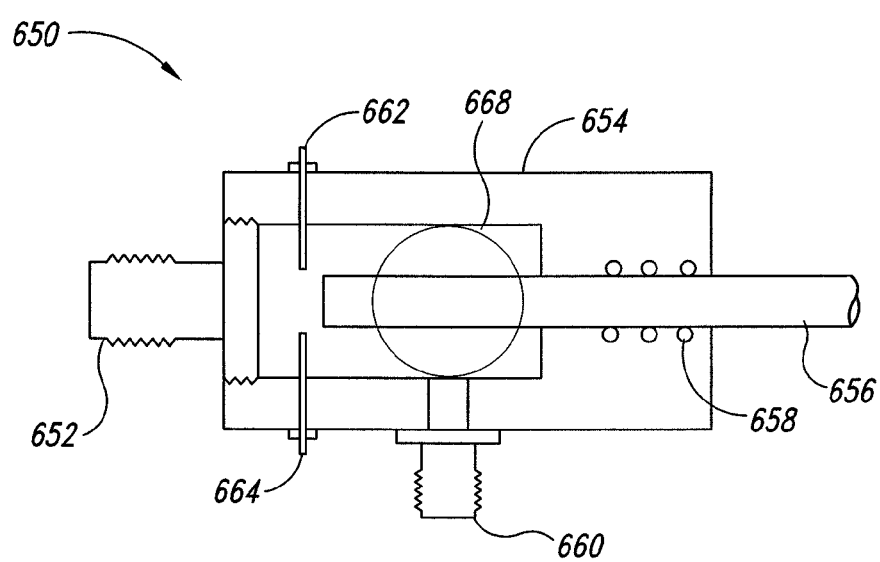
FIG. 6B is a schematic diagram illustrating a device for producing pressurized gases for a solar collector assembly in accordance with aspects of the disclosure.

FIG. 6B is a schematic diagram illustrating a device 650 for producing pressurized gases for a solar collector assembly. Pressurized oxygen is delivered through a port 652 to a ceramic chamber 654 where a carbon donor 656 is combusted to produce carbon dioxide. Thermal transfer to carbon donor 656 may be achieved with induction heating coils 658. The carbon donor 656 may be any suitable source of carbon, including polymers selected from ocean trash accumulations and other substances such as paraffin and polyethylene, or carbon in the form of a cylindrical bar stock, as shown. Electrodes 662, 664 provide plasma to ignite the carbon donor bar stock 656. Carbon dioxide is delivered to the device by a port 660. Retracting the carbon donor bar stock 656 allows rotation of a check ball valve 668 to cut off the oxygen and extinguish the reaction, possibly ending the production of carbon dioxide. If present, water vapor may be left as an IR blocker gas, or may be trapped or filtered out of the device, depending upon ambient conditions such as temperature and/or pressure changes.

Figure 7:
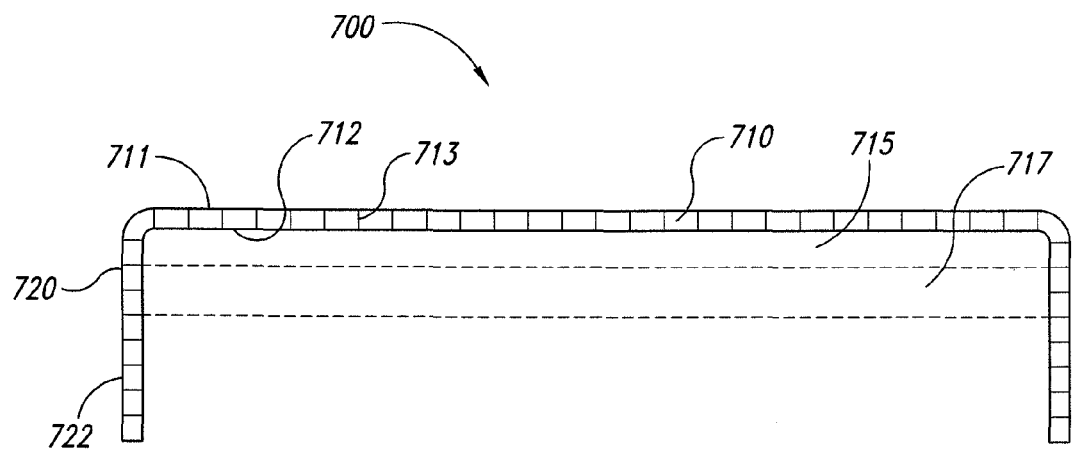
FIG. 7 is a schematic diagram illustrating a solar collector for use with various water currents in accordance with aspects of the disclosure.

At times, ocean conditions may provide opportunities to utilize or create currents of relatively warm water for improved heat delivery to an OTEC plant. FIG. 7 is a schematic diagram illustrating a solar collector for use with water currents. The solar collector assembly 700 includes layers of thin, transparent polymers that may hold insulating gas (e.g., air or carbon dioxide) in an insulating space 710 to trap solar energy in the water 715 beneath the collector. The trapped energy may prevent evaporative cooling of the water 715, or may provide heated water 715 as a supplement to an OTEC plant. Such an assembly, or "Solar Collector Barge," 700 includes thin transparent glazing(s) 711, 712 spaced apart by connecting web(s) 713 for maximizing the solar energy trapping and insulating functionality of the assembly. The layer 712 may reflect and/or absorb wavelengths corresponding to radiation from substances at 50 degrees C. or cooler, to effectively trap and retain solar energy in the water 715. The assembly may include subsurface extensions of gas-insulated walls 720 at the edges, and flood cells 722 with water or provide additional stiffeners and/or weights as needed to stabilize the assembly in the water. The assembly may be straight or curved in configuration in order to cancel or provide Coriolis acceleration as the water 717 travels into and out of the barge In some cases, the barge 700 may include stiffening panels to the vertical sides 720 or include stiffener truss struts and braces below or above the waterline between the vertical sides 720. The barge may include position thrusters to achieve and maintain a desired position and orientation of the barge 700 in an ocean current or stream.

In some cases, the barge 700 and various layers are formed by extrusion to create extrusion blow-molded structures that incorporate polymer preparations including recycled and/or reconstituted polymers derived from ocean trash. Components of the barge may collect polymer articles that have been discarded into the ocean and thermoplastically reform or otherwise chemically alter and/or incorporate certain ingredients to form mixtures or alloys of the walls of the barge. For example, ships or barges may operate in the ocean on feedstock including materials recovered from ocean trash accumulations and/or on land-based plants that utilize discarded or conventionally discarded polymer products to prevent such materials from being added to the trash accumulations in the world's oceans.

Solar Energy Supplemented OTEC Systems

Figure 8A:
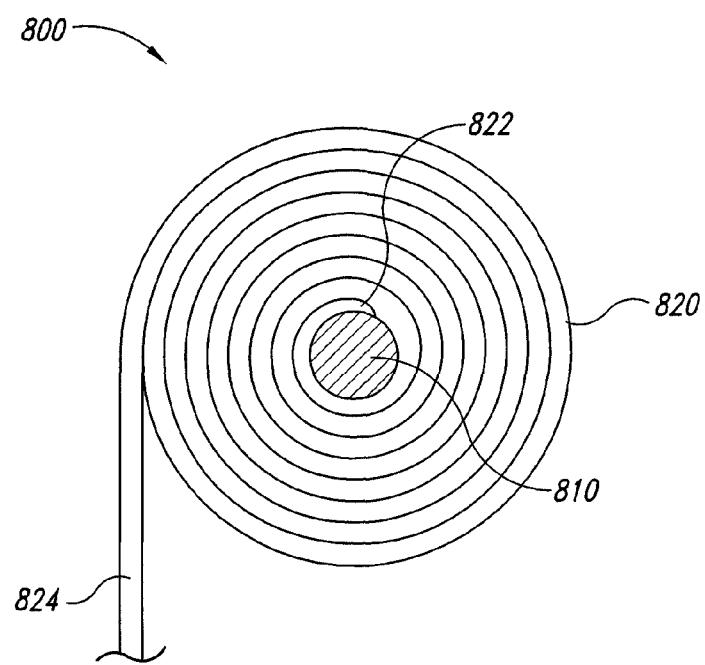
FIG. 8A is a schematic diagram illustrating a top view of a supplemented OTEC system in accordance with aspects of the disclosure.

As described herein, the system may add a supplement, such as the various solar collector assemblies described herein, to an OTEC system, in order to increase the efficiency of a heat engine of the OTEC system. FIG. 8A is a schematic diagram illustrating a top view 800 of a supplemented OTEC system.

The system includes an OTEC plant 810 surrounded by a synergistic heat-conserving spiral formed solar collector assembly 820. The spiral assembly 820 may be stabilized with high-strength carbon reinforced polymer netting (not shown) that extends across the top and bottom of the spiral assembly. In some cases, additional support and stabilization may be provided by occasional tie-lines from the top netting to the bottom layer. The netting may be electrometric in applications that have extreme variations in ambient temperature, allowing each spiral length and width to change in order to accommodate thermal contraction and expansion. In some cases, additional support and stabilization may be provided by thin strips of polymers, such as strips used to cover various formed seams. In some cases, additional support and stabilization may be provided to each additional spiral layer by a suitable adhesive, or by welding to fasten the assembly. In some cases, additional support and stabilization may be provided with high strength radial cables or straps along with circumferential straps.

Thus, the resulting spiral assembly is self-stabilizing despite being formed of inexpensive thin polymer walls. In some cases, the assembly may be configured to provide air-cushioned vehicle travel over the spiral collector assembly 820 for personnel travel to and from the OTEC plant 810 in the center of the spiral.

In operation, water from the surface of the ocean enters the spiral assembly 820 at an inlet opening 824. The water travels through the assembly, receiving heat from the spiral assembly during the transport. The water is provided to the OTEC plant 810 via an outlet opening 822 coupled to the OTEC plant 810. Of course, the assembly 820 may include fewer or more spirals than shown in the Figure, may be partially spiraled, may be longitudinal, or may be assume many other configurations as needed.

This, in some embodiments, the supplemented OTEC systems described herein improve upon the material-utilization efficiencies of conventional OTEC plants that require use of insulated pipes to pump ocean water from considerable distances in order to provide the highest available water temperature from the surface and the coldest available temperature from the ocean depths, among other things. The spiral assembly, in some embodiments, facilitates the delivery of heated water at a desired temperature and facilitates the collection of warm temperature water near the spiral assembly.

That is, for the same volume of material inventory, a spiral thin-walled assembly provides a higher thermal efficiency over long pipes used to pump water from large distances. Example materials include polyolefins, polyvinyl fluoride $(C_2H_3F)_n$, polyvinylidene fluoride $(C_2H_2F_2)_n$, and numerous other high temperature polymers, including materials that have been discarded into the world's oceans. In some cases, the assembly 820 is fabricated using U.V. resistant fluoropolymers, including modifications such as polyvinyl-fluoride, for transparent layers, and is fabricated using polyolefins such as polyethylene or polypropylene, for the black or selective transmission layers that enhance the solar gain in portions of the assembly.

Figure 8B:
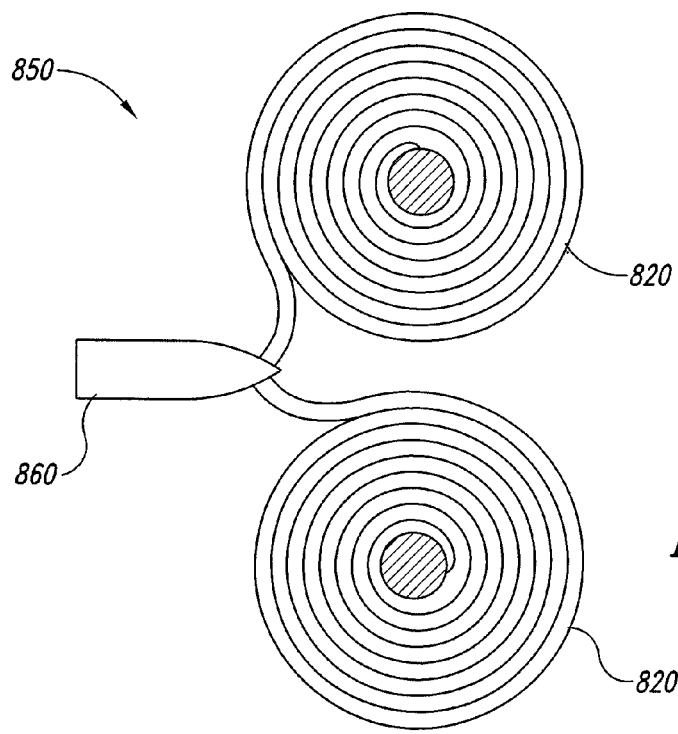
FIG. 8B is a schematic diagram illustrating a top view of a supplemented OTEC system having multiple solar collector assemblies in accordance with aspects of the disclosure.

FIG. 8B is a schematic diagram illustrating a top view 850 of a supplemented OTEC system having multiple solar collector assemblies. The OTEC system includes an OTEC plant 860 on a barge or ship, and two or more solar collector assemblies 820 that provide heated water to the OTEC plant. In some cases, the utilization of multiple solar collector assemblies 820 allows solar energy to be stored in a "bank" of collectors for supplying hot water to the OTEC plant 860 at night and/or during overcast weather. For example, during the day the OTEC plant 860 is supplemented by water heated by one or more collector assemblies 820, while one or more additional solar collector assemblies heat and store the heated water for later use. In some cases, the collector water inlet is located on the inside of the spiral to prevent debris from clogging inlet filters.

The water in the solar collector assemblies that store the heated water may be heated to 65 degrees C. in order to realize an extra high efficiency of operation and/or to mix the hottest water with unheated sea water to produce warm water at 45 degrees C. for extending the operation time of a supplemented OTEC plant 860 at night and/or during overcast days. The solar collector assemblies 820 may be wound clockwise or counterclockwise, although in some cases they are configured to provide Coriolis acceleration from the inlet to the outlet of the water being heated.

Figure 8C:
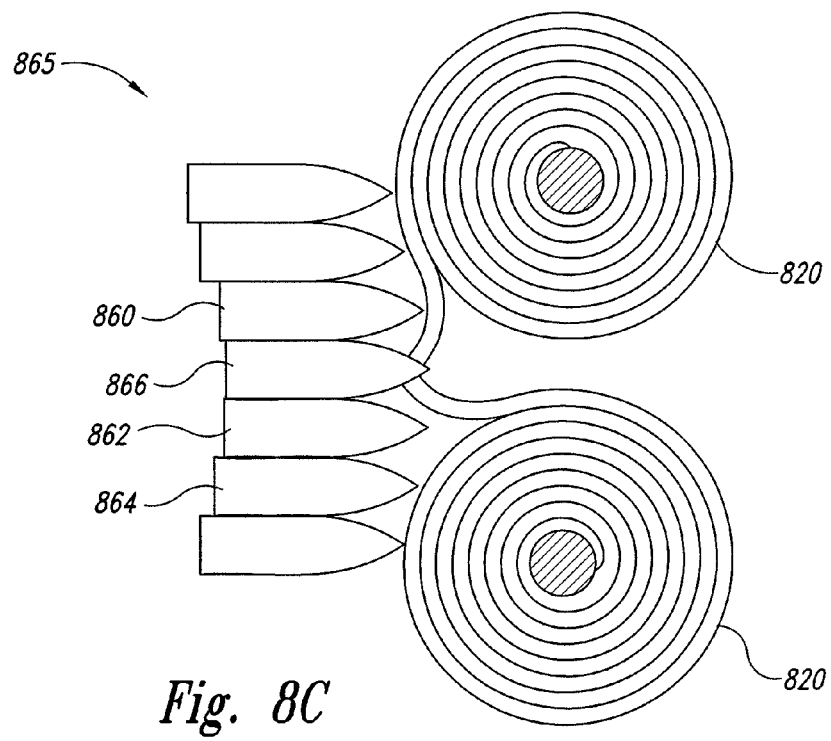
FIG. 8C is a top view of a solar thermal energy conversion system in accordance with aspects of the disclosure.

FIG. 8C is a schematic diagram illustrating a top view 865 of a supplemented OTEC system having multiple solar collector assemblies and multiple barges and OTEC plants. The system includes two or more solar collector assemblies 820 and two or more barges 860, 862, 864, 866. The multiple barges may include one or more OTEC plants supplemented by the heated water from the solar collector assemblies, and may include other types of energy generating systems and plants, such as hydrogen generation plants, carbon generation plants, and so on. That is, the system may facilitate supplementing an OTEC plant with other generative processing systems, such as those described herein.

Figure 9:
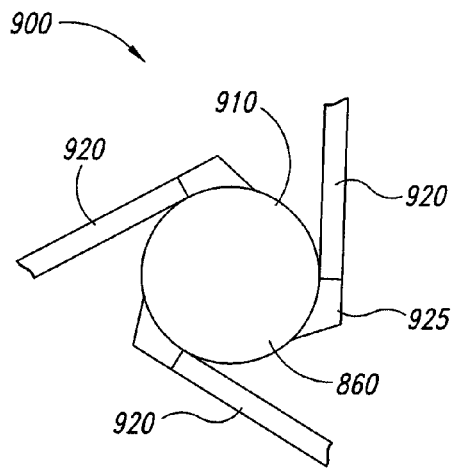
FIG. 9 is a schematic diagram illustrating a top view 900 of an OTEC plant supplemented by multiple spiral assemblies in accordance with aspects of the disclosure.

In some cases, where an OTEC plant requires higher flow requirements and/or less dwell time, the system may incorporate two, three, four, or more spiral assemblies that extend from the OTEC plant. FIG. 9 is a schematic diagram illustrating a top view 900 of an OTEC plant supplemented by multiple spiral assemblies. The OTEC plant 910 receives the delivery of heated water from three spiral assemblies 920 interchangeably coupled to solar collector barge 860 by connector elements 925. As described herein, the length of the spiral assemblies provides for delivery of solar heated water during the night, such as for certain applications that utilize night periods for leveling electrical loads (e.g., operations that include the electrolysis of water to produce hydrogen and oxygen at night). The heating and storing of heated water within the spiral assemblies facilitates improved day and night thermal efficiencies, among other benefits. Additionally, the production of hydrogen by electrolysis at night facilitates electricity sales at night that improve the return on investment for expensive OTEC plants, among other benefits.

Figure 10:
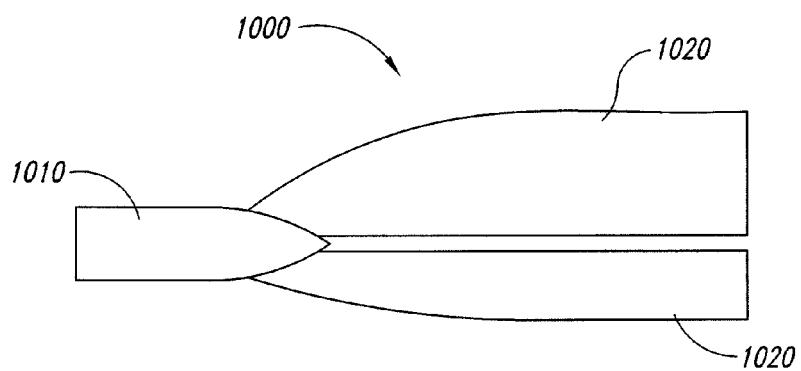
FIG. 10 is a schematic diagram illustrating a top view of an OTEC plant supplemented by solar collector barges in accordance with aspects of the disclosure.

In some embodiments, the surface length, width, and depth of heated water is proportioned to deliver the thermal requirements of an OTEC plant while utilizing the natural momentum of ocean currents and enables very low cost solar collection, storage and delivery to an OTEC plant. FIG. 10 is a schematic diagram illustrating a top view 1000 of an OTEC plant supplemented by solar collector barges. Natural or created ocean currents of relatively warm water moving toward an OTEC plant 1010 are heated by two or more solar collector barges 1020 for delivery and/or storage of the heated water to optimize the operations of the OTEC plant 1010. In some cases, the depth of suitably heated water would increase as the water passes through the barges 1020, and/or would change in cross-sectional proportions, as needed, to optimize the efficient operation of heat exchangers in the OTEC plant 1010.

Figure 11:
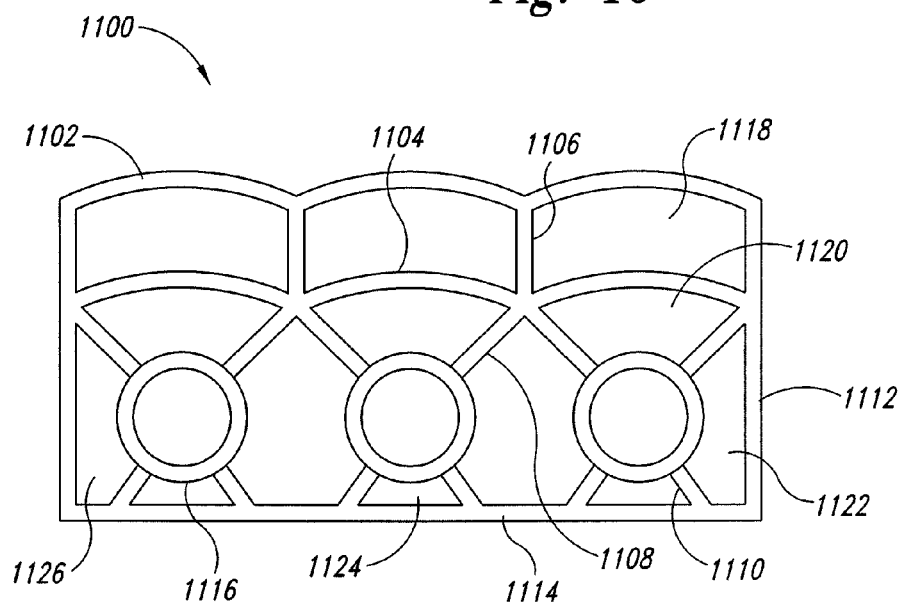
FIG. 11 is a schematic diagram illustrating a side view 1100 of a solar collector assembly configured to directly heat a working fluid used by a heat engine in accordance with aspects of the disclosure.

FIG. 11 is a schematic diagram illustrating a side view 1100 of a solar collector assembly configured to directly heat a working fluid used by a heat engine. For example, the solar collector assembly may directly heat working fluids, such as ethane, propane, butane, ammonia, and/or halogenated hydrocarbons including selected mixtures, for operation of closed or combined cycle OTEC plants. Such an assembly may eliminate the need for a biofueling heat exchanger, and may realize a higher temperature achievement for the working fluid over other techniques. The solar collector assembly may utilize a thermodynamic cycle such as a Larsen-McAlister cycle, a Brayton cycle, an Ericsson cycle, and/or a Rankine cycle, in which the working fluid is pressurized to provide a greater density and pressure drop for vapor expansion in a power turbine.

The selected working fluid is heated within target tube(s) 1116. The lenses 1102 and 1104 and webs 1106 and 1108 are transparent to solar radiation. The solar radiation may be concentrated to a desirable extent by a ratio of the apparent area of 1102 to the apparent area of 1116. The webs 1106 and 1108 serve as light pipes and/or reflective guides to deliver light into the tube(s) 1116, which may be opaque or transparent, depending upon the optical and chemical properties of the selected working fluid. The support and insulated isolation of the tube(s) 1116 may employ opaque polymer webs such as webs 1110, 1112 and bottom web 1114, as shown. In some cases, the assembly includes insulated and long-IR-blocking gases, such as carbon dioxide, argon, oxides of nitrogen, or sulfur hexafluoride, in channels 1120, 1122, 1124, and 1126 to trap heat delivered to the fluid in the tube(s) 1116 and to minimize convective, conductive and/or radiative losses from the tube(s) 1116. The channels 1118, 1120, 1122, and 1124 are designed to have the volume/pressure needed for desired submergence and/or to adjust the buoyancy or rigidity of the assembly.

Figure 12:
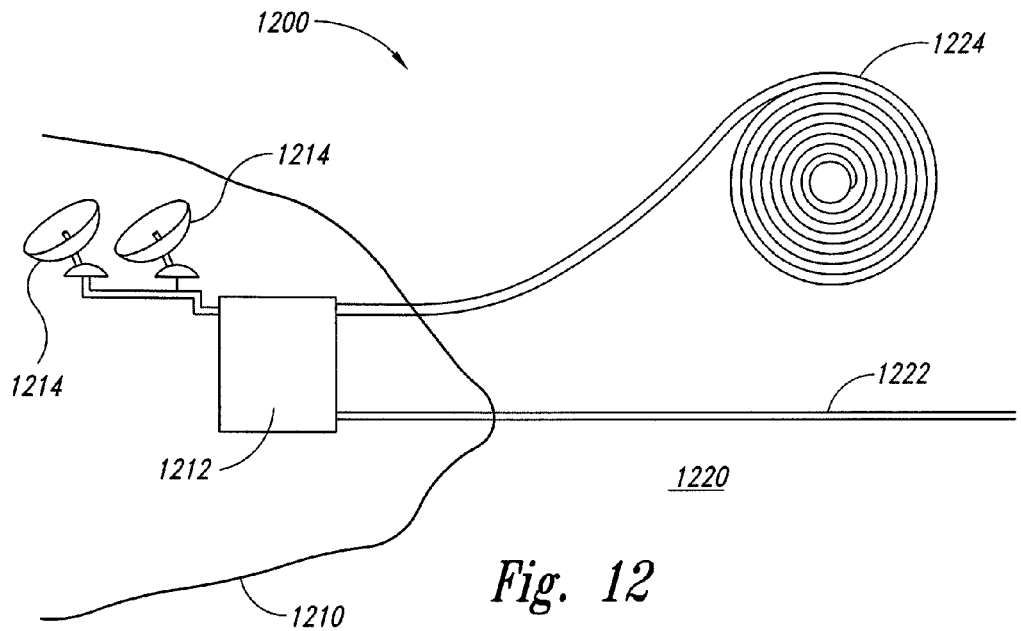
FIG. 12 is a schematic diagram illustrating a top view 1200 of a land-based OTEC plant supplemented by solar collector assemblies in accordance with aspects of the disclosure.

FIG. 12 is a schematic diagram illustrating a top view 1200 of a land-based OTEC plant supplemented by solar collector assemblies. An OTEC plant 1212 on land 1210 is supplemented by various different types of solar collector assemblies, including a spiral collector assembly 1224 and linear solar collector 1222 at sea 1220, and land-based solar collectors 1214.

For example, the OTEC plant 1212 may be served by a spiral collector assembly 1224 that is about 1.5 miles in diameter for delivery of collected solar thermal energy sufficient to provide a net output of 10 MW of electricity from the OTEC plant 1212. The OTEC plant 1212 is also served by solar concentrators 1214, which may be point-focus types for heating hydrogen working fluid to about 800 degrees C. for expansion in a regenerative system based on a heat-engine cycle such as a Stirling cycle, an Ericsson cycle, and/or a Brayton cycle. The heat not converted into work and/or electricity by the regenerative energy conversion system may be used to warm incoming ocean water for improving the OTEC efficiency, or rejected to the cold ocean water delivered by conduit 1222 to maximize the overall energy conversion efficiency.

In some cases, the system may utilize an extension of the solar collector assembly 1224 as a conduit for continued solar heating and insulation of heated water. In some cases, the system utilizes the heated ocean water from one or more of the solar collector assemblies while one or more additional solar collector assemblies heat and store solar warmed water for use at night.

Integration of SOTECs with Other Generative Systems

As described herein, in some embodiments an OTEC plant is integrated with other generative systems, such as hydrogen generation systems, methane generation systems, and so on. That is, adding an OTEC plant into a recyclable system used to generate resources may facilitate the increased economic development of resources and nutrient regimes, among other benefits.

Figure 13:
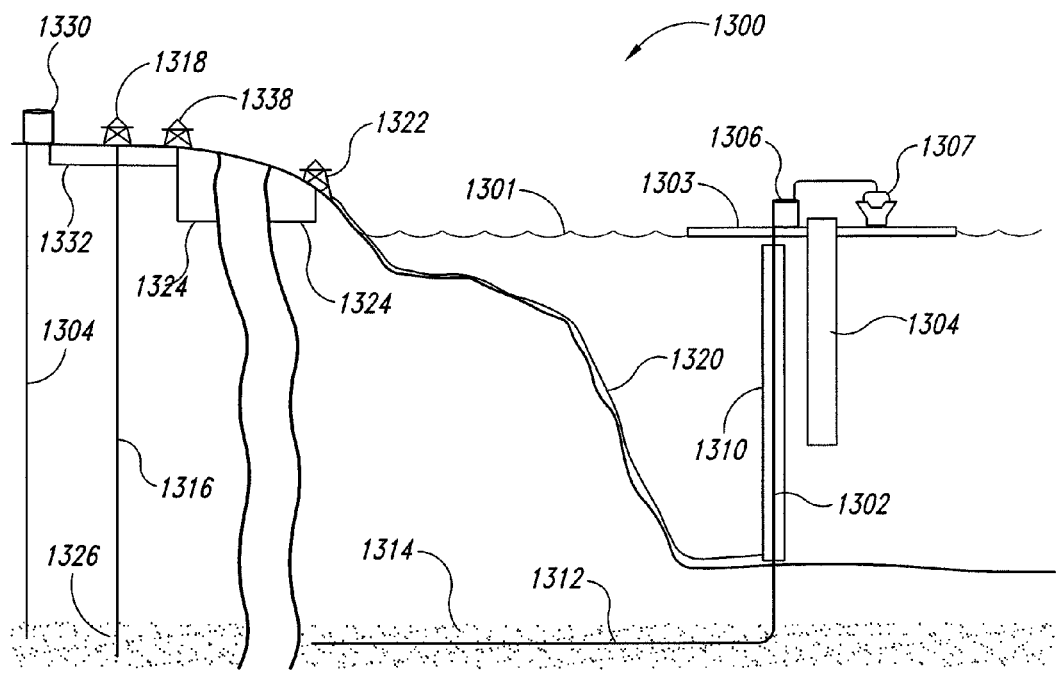
FIG. 13 is a schematic diagram illustrating an OTEC plant supplemented by heat from geological formations in accordance with aspects of the disclosure.

FIG. 13 is a schematic diagram 1300 illustrating an OTEC plant supplemented by heat from geological formations. For example, an OTEC plant 1304 is at a location where the water is too cool at the surface or too warm at the depths to support sufficient generation electricity. The OTEC plant 1304 is supplemented by heat from a solar collector assembly 1303 and/or by heat from an electrolyzer 1306 or a heat engine 1307. The electrolyzer 1306 and/or heat engine 1307 may utilize on-site and/or pipeline accessed underground storage of hydrogen in a suitable geological formation 1314, which may or may not bear appreciable amounts of fossil hydrocarbons, to use fuel cells in a regenerative mode to meet sufficient electricity generation standards.

The size of a pipe 1310 should be sufficient for the storage of hydrogen that is produced. For example, during times of low solar gain or at night the system can meet electricity demands by utilizing hydrogen from the storage pipe 1310 and/or from the subterranean storage reservoir 1314 to power the heat engine 1307 and/or the reversible electrolyzer fuel cell(s) 1306. The additional storage of hydrogen is provided by the delivery of the hydrogen through pipeline 1320 and or through the tube 1302 and/or horizontal extension tube 1312 into depleted petroleum formations and/or other suitable formations such as salt or limestone caverns in continental locations closer to, markets for electricity and/or hydrogen.

North America and other continents include geological formations that are suitably porous and sealed at a depth sufficient to safely and efficiently store hydrogen. Such formations have stored methane for millions of years, where organic materials were deposited at the time of their geological development. Such formations have also stored hydrogen produced by continental drift-induced collisions of hot olivine and limestone for millions of years.

Additionally, offshore oil and natural gas formations are similarly proven geological settings for long-term storage of hydrogen produced by electricity from OTEC plants. Referring back to FIG. 13, the delivery of hydrogen from the OTEC plant 1304 to land markets is facilitates by pipeline 1320 which connects through valve head 1322 to pipeline 1324 and thus to valve 1338 to supply wellhead and pipe 1316 to subterranean storage 1326.

In some cases, the heat engine 1307 is a rapid start engine that can quickly provide electricity and additional heat to the OTEC plant 1304 to improve the output of the plant. The OTEC plant may utilize supplemented energy, such as solar energy, to dissociate hydrocarbons, such as methane hydrates, into hydrogen and carbon. The hydrogen can be used in the heat engine 1307 and/or the fuel cell 1306 to provide shaft work and/or electricity. The carbon can be used to manufacture durable goods, including wind, wave, hydro and/or solar harnessing equipment. Further details regarding the dissociation of hydrocarbons and other similar processes may be found in related copending applications referenced and incorporated above.

The ability of OTEC systems to operate in waters that do not provide sufficient temperature differences between surface waters and deep waters facilitates utilizing OTEC plants to produce methane from clathrate deposits. Details regarding the production of methane from clathrate deposits may be found in related copending applications referenced and incorporated above.

Referring to FIG. 13, methane recovered from clathrates and other ocean resources is delivered into pipe 1310 and pressurized by the electrolytic production of hydrogen using the electrolyzer 1306. The thermochemical dissociation of a hydrocarbon compound or polymer or methane from clathrates to produce carbon and hydrogen and/or electrolysis of water to provide pressurized hydrogen is considerably more efficient than operating a mechanical pump to pressurize hydrogen. Also adding pressurized hydrogen to methane in a confined space produces a mixture that is at a greater pressure than the methane at the start of hydrogen addition. Accordingly, mixtures of hydrogen and methane are delivered by the pipe 1320 to the land markets depicted or stored in formations 1314 and/or 1326 as needed to improve overall system economics and meet market conditions, among other benefits.

The storage of hydrogen and/or mixtures of hydrogen and methane in depleted oil and natural gas in reservoirs, such as formation 1326, facilitates the increased recovery of fossil hydrocarbons, among other things. The storage of hydrogen improves the permeability of fossil hydrocarbon formations. The storage of hydrogen facilitates providing needed heat by directed addition of oxygen and combustion of hydrogen in locations needing the heat, such as for the production of fossil hydrocarbons from tar sands, shale, and depleted oil and natural gas formations.

Thus, electricity from an OTEC plant 1304 or other renewable energy conversion operations is utilized to produce oxygen and hydrogen by an electrolyzer 1330. Pipeline 1332 delivers the hydrogen to enrich and pressurize natural gas and methane as needed to pipeline 1324, and/or for storage in formation 1326, as shown. The oxygen produced and pressurized by electrolyzer 1330 is sent to medical and other commercial markets and is delivered through conduit 1334 to combust hydrogen to heat hydrocarbons for increased production from reservoir 1326, as shown.

In some embodiments, electricity produced by an OTEC plant, such as a supplemented OTEC plant, is used in an electrolyzer to produce hydrogen and oxygen. The addition of supplemental energy, such as concentrated solar energy provided by a solar collector, reduces the electrical energy required for electrolysis in the electrolyzer. For example, about 18 grams (one gram mole) of water is decomposed by electrical work equivalent to the free energy of formation $\Delta G$, which is 237.13 kJ. This process is endothermic and consumes additional energy equal to ($T\Delta S$) of 48.7 kJ/mol, which is the work done in expanding the produced hydrogen and oxygen to standard temperature and pressure.

$$\Delta H = \Delta G + T\Delta S \quad \text{Equation 1}$$

(285.83 kJ/mol=237.13 kJ/mol+48.7 kJ/mol).

Because the dissociation process is endothermic, the system can utilize solar energy and/or waste heat from other processes. The additional heat elevates the temperature of the electrolysis because the heat reduces the amount of Gibbs free energy ($\Delta G$) that must be provided as electrical work. Thus, the total applied voltage is less than required to dissociate water at ambient temperature.

Assuming that the endothermic energy comes from a waste heat source or the environment, the minimum applied voltage to dissociate water is $$\Delta G = -nFE° \quad \text{Equation 2}$$

As this minimum voltage requirement ($E°$) is dependent upon the change in free energy ($\Delta G$), $E°$ is equivalent to $\Delta G$ divided by the number of electrons exchanged (n) times the Faraday constant ($F=9.648\times10^4$) or (nF). As the electrolysis temperature increases above standard temperature of 25° C., the free energy approaches zero as the temperature of electrolysis approaches the temperature that would be produced by an adiabatic stoichiometric combustion reaction.

In some cases, increasing the pressure of electrolysis produces pressurized hydrogen and oxygen storage at a desired density. Increasing the pressure requires a higher voltage for electrolysis. Equation 3 illustrates the relationship of pressure and voltage requirements. Electrolysis voltage (Ep) can be found by adding the Nernst adjustment for pressure rise to $E°$:

$$Ep = E° + RT/nF \ln P_{H2}(P_{O2})/P_{H2O} \quad \text{Equation 3}$$

Assuming that the hydrogen and oxygen are produced at the same pressure and the feed water is liquid at the same pressure, Equation 3 is simplified to $$Ep = E° + 3RT/4F(\ln P_i/P_{atm}) \quad \text{Equation 4}$$

Thus, the increase in voltage to produce 10,000 PSI oxygen and hydrogen from 10,000 PSI water is $3RT/4F \ln P_i/P_{atm} = 3RT/4F \ln 680.3 = 3 (8.3144 \text{ J/molK}) 298K (6.522)/4(9.648\times10^4) = 0.125$ V.

Adding heat to vaporize water lowers the voltage required to dissociate water.

$$\Delta G°_T = \Delta H°_{T(298K)} - T\Delta S°_{298K} \quad \text{Equation 5}$$

Thus the voltage required for dissociation approaches zero as $T\Delta S°_{298K}$ approaches $\Delta H°_{T(298K)}$, which is 285.83 kJ/mol. The change in entropy at standard temperature ($\Delta S°_{298K}$) is 0.1634 kJ/mol, therefore $$285.83 \text{ kJ/mol}/0.1634 \text{ kJ/mol} = 1,749K \text{ or } 1,476° \text{ C.}$$
$$(2,689° \text{ F.}). \quad \text{Equation 6}$$

Figure 14:
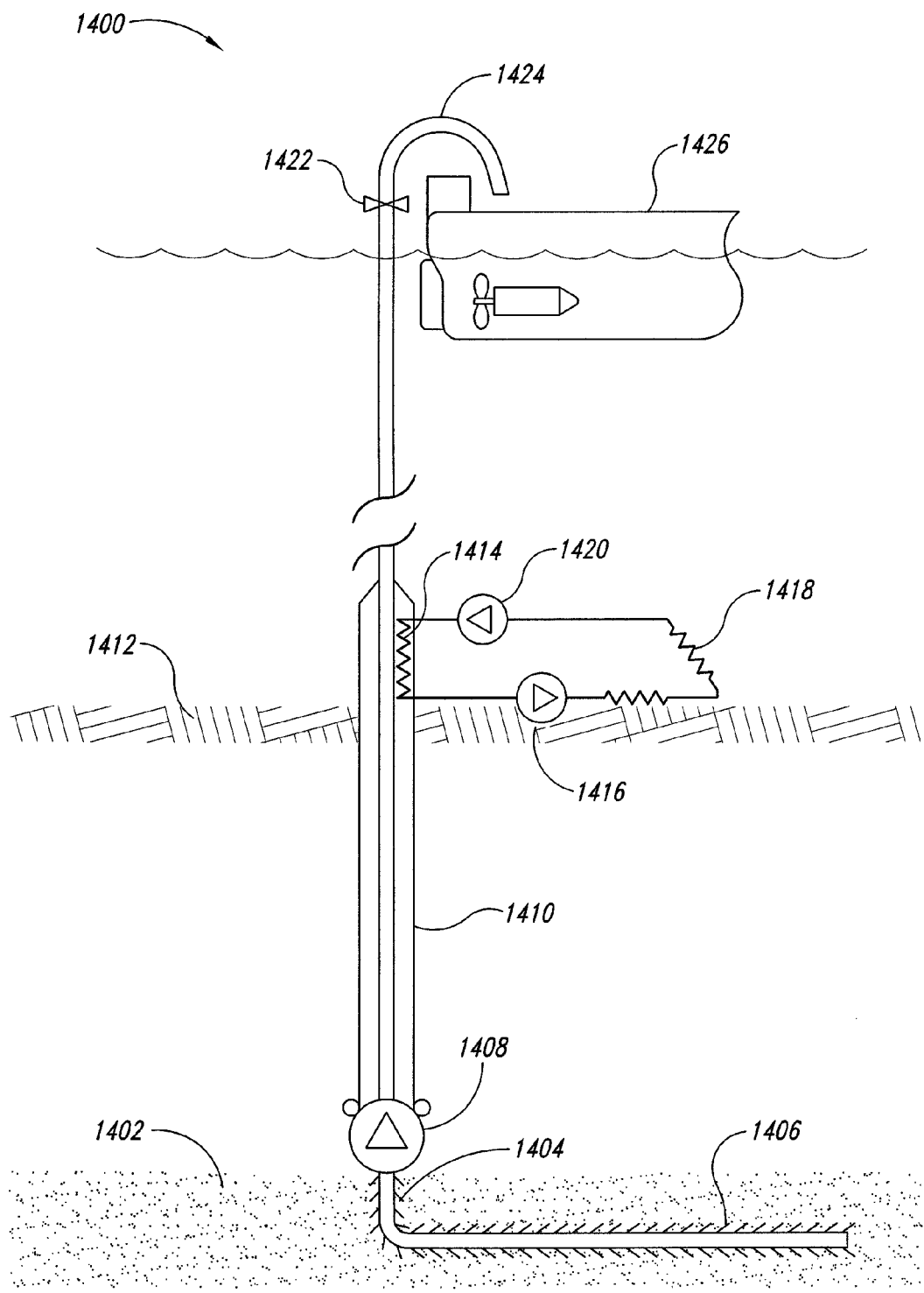
FIG. 14 is a schematic diagram illustrating an OTEC system supplemented by geothermal energy in accordance with aspects of the disclosure.

FIG. 14 is a schematic diagram illustrating an OTEC system supplemented by geothermal energy. In some embodiments, an OTEC system utilizes geothermal energy from formations beneath the ocean floor in conjunction with the heat sink of cold water and/or methane ice formations near the ocean floor. For example, the OTEC plant may utilize a well that contains new or relatively depleted oil or gas wells in a new cycle. Temperatures of petroleum producing formations beneath ocean floors generally exceed the temperature of the ocean surface. The potential efficiency limit for a typical cycle for utilization of heat provided by such formations to working fluids such as those listed in Table 1, copending applications referenced and incorporated above, or by the fluid being extracted from such formations, is summarized in Equation 7:

$$\text{Efficiency Limit} = 1 - TL/TH \quad \text{Equation 7}$$

When the highest temperature achieved by the working fluid for expansion to produce work is 100° C. (212° F.) and the heat-rejection temperature at the end of work production is at the general temperature of gas hydrates, such as 6° C. (42.8° F.), a limit of efficiency is shown in Equation 8:

$$\text{Efficiency Limit} = 1 - 279° \text{ K}/373° \text{ K} = 25\% \quad \text{Equation 8}$$

FIG. 14 illustrates operation of an OTEC system 1400 using geothermal resources in conjunction with petroleum production, such as natural gas and/or oil from geothermal formation 1402, from a suitable vertical well 1404, or from horizontal extension 1406. The petroleum is delivered to the surface after providing heat exchange to a selected working fluid at a suitable location 1412, such as near the ocean floor by the pressure of formation 1402 and/or by the assistance of a suitable pump 1408 to provide delivery through insulation system 1410, as shown. Heat is transferred by a suitable heat exchanger such as a countercurrent heat exchanger 1414 to vaporize and/or superheat a suitable working fluid in the circuit with a suitable motor such as a turbine 1416 or 1420 that drives an integral generator for electricity production. The vapors from the working fluid expansion and work production are condensed by a heat exchanger 1418 to cold ambient temperature sea water and/or clathrate formations, when the system is further provided with a collection system as described in related copending applications referenced and incorporated above, which is hereby incorporated by reference in its entirety. The condensed working fluid is heated and revaporized by the heat exchanger 1414, as shown. Petroleum is delivered through delivery device 1424 to the surface by various arrangements, such as a floating or anchored platform 1422 to facilitate pipeline transmission (not shown), tanker delivery, such as by tanker 1426, and so on.

Figure 15:
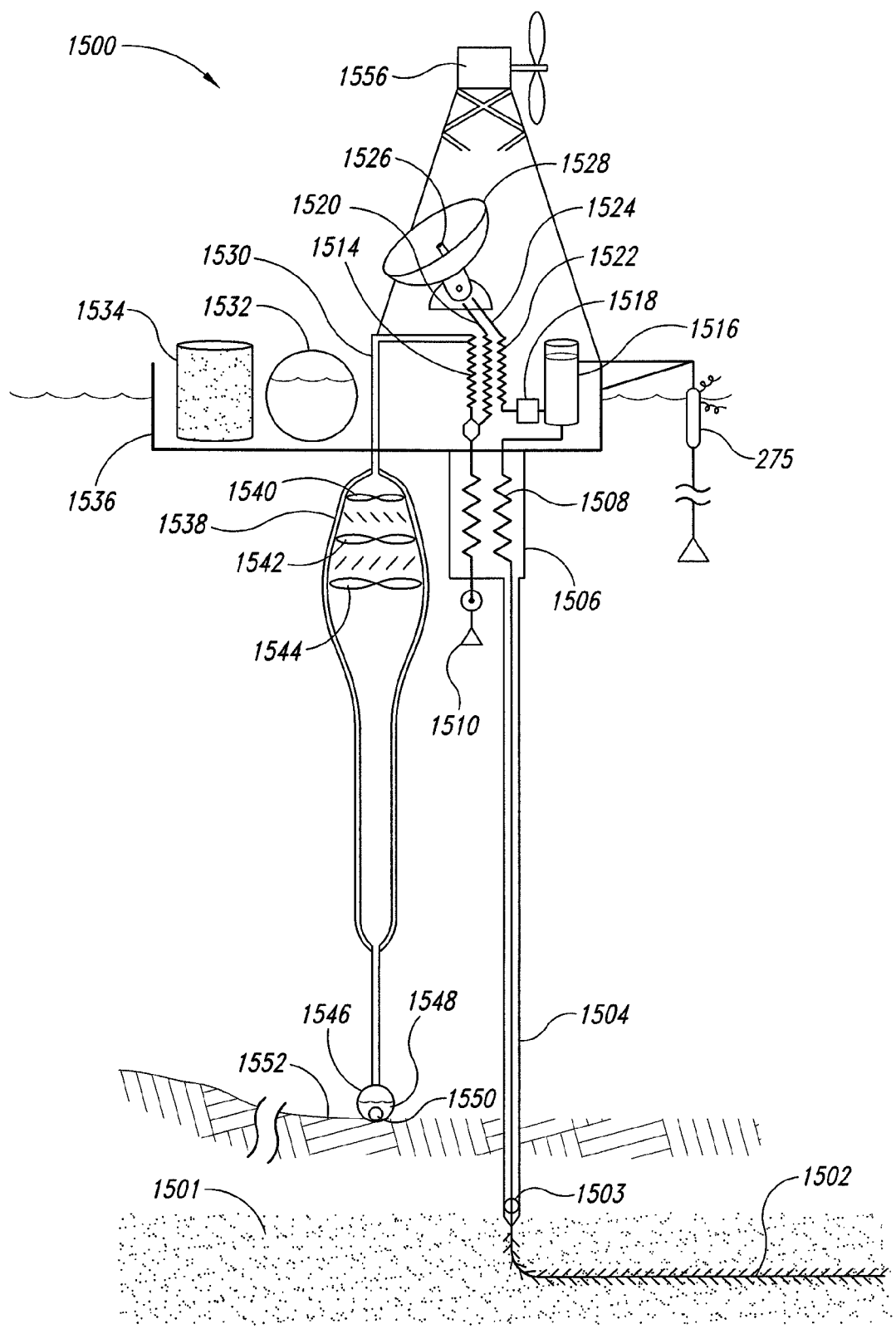
FIG. 15 is a schematic diagram illustrating a system for integrating an OTEC system with other energy generation systems in accordance with aspects of the disclosure.

FIG. 15 is a schematic diagram illustrating integrating an OTEC system 1500 with other energy generation systems. The system 1500 transports hot fluid from a geological formation 1501 such as may be found beneath the ocean floor to the surface of the ocean. At or near the surface further heat additions may be provided to improve the energy conversion efficiency from solar, wind, moving water, heat engine, thermochemical regenerator, or fuel cell sources, and/or heating of another working fluid such as evaporant from ocean water provided by flow through pickup 1510 or ammonia (not shown) by counter current heat exchangers 1508, 1530, 1520, and expansion of such working fluid to near the cold temperature of the ocean floor at condenser 1536 as shown to condense the working fluid, which is shown as liquid water 1538.

After the pressure and most of the thermal energy of heated vapors are expended by accomplishing work on motors, such as one or more expansion turbines 1530, 1528, and turning vanes, such as 1532 and turbine 1534, and further cooling by ocean water, condensed pure water 1538 at the vapor pressure commensurate with the temperature of the cold ocean floor is delivered by pump 1550 to pipeline 1552 for transport to the surface for deliveries by ships or to land by pipeline 1552, as shown. Depending upon ocean conditions, in some cases, the condenser 1546 may be placed closer to the ocean surface near the expansion turbine 1544 and the cold water is pumped from cold depths to provide cooling of the vapors traveling downward past turbine 1544.

During operation, the hot fluid (such as oil, natural gas, and so on) from a suitable well that may include a horizontal collector 1502 is passed upward by formation pressure and/or by additional pressure provided by pump 1503, as shown, through an insulated conduit assembly 1504 to a suitable heat exchanger 1508 in insulated heat exchange well 1506, as shown. Petroleum is then stored in vessel 1516 on a suitable platform such as energy-barge 1536 for shipment to market, or some or all of the petroleum may be utilized to provide more valuable carbon for production of durable goods along with hydrogen by dissociation, as generally summarized for various hydrocarbons (CxHy) in Equation 9:

$$CxHy + HEAT \rightarrow xC + 0.5yH_2 \quad \text{Equation 9}$$

The energy barge 1536, or another suitable platform, may host one or more solar energy conversion systems, such as concentrators 1526, one or more wave generators 1524, and/or one or more wind generators 1556.

The heat in Equation 9 may be provided by harnessing kinetic energy from wind, waves, ocean currents, or solar energy, such as may be provided by a suitable radiation trap and/or point-focus concentrator 1528 or suitable line-focus systems. In some cases, the electricity generators that convert solar, wind, moving water, and/or geothermal energy may be utilized to drive resistive and/or inductive heating systems that supply part or all of the heat shown in Equation 9 to drive the endothermic process shown in Equation 9.

Hot inventories, of hydrogen and carbon produced in reactor 1526 are utilized to provide preheating of hydrocarbons delivered to reactor 1526 by the counter-current heat exchange system described herein, when there is a sufficient thermal gradient to provide the additional heating of water vapors delivered by a suitable filter and pump assembly 1510. Following the heat deliveries, hydrogen may be stored in a suitable tank 1532 and carbon for manufacture of durable goods may be stored in tank 1532.

In some embodiments, photosynthesizing plants are grown in conjunction with the operations described herein, and such plant crops are anaerobically processed to provide thermal dissociation or microbial digestion to produce methane, carbon dioxide and/or carbon monoxide. The hydrogen produced by reactor 1518 may be stored as an energy-dense liquid, such as methanol. Equations 10 and/or 11 summarize processes in which carbon dioxide from one or more suitable sources reacts with hydrogen to form one or more dense, easily stored, and conveniently transported liquids:

$$3H_2 + CO_2 \rightarrow CH_3OH + H_2O \quad \text{Equation 10}$$

$$2H_2 + CO \rightarrow CH_3OH \quad \text{Equation 11}$$

Figure 16:
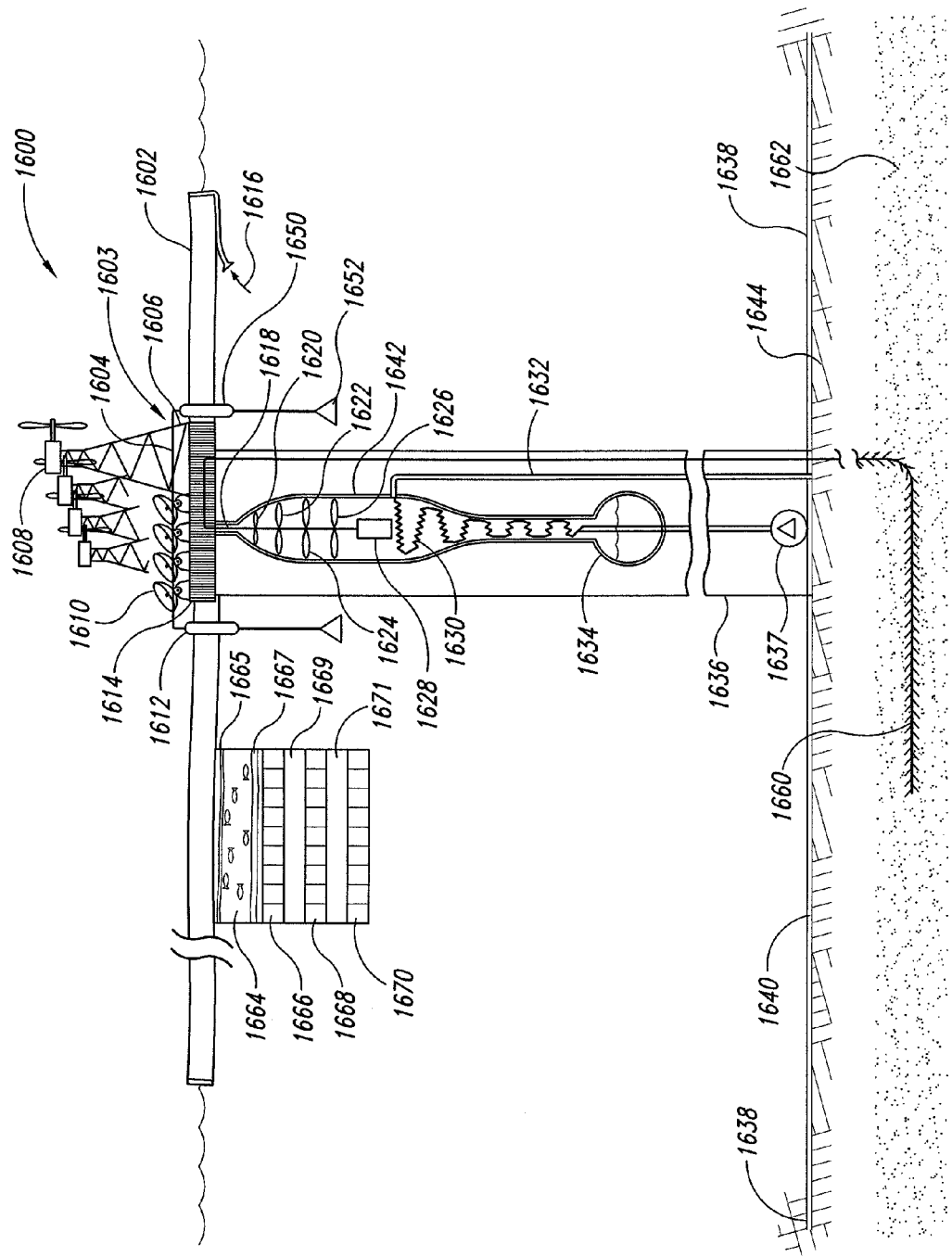
FIG. 16 is a schematic diagram illustrating a system for integrating an OTEC system with methane release mechanisms in accordance with aspects of the disclosure.

FIG. 16 is a schematic diagram illustrating a system 1600 for integrating an OTEC system with methane release mechanisms. In many locations, an OTEC system and other generative systems described herein may be located in areas having earthquakes, changes in ocean currents, ocean warming, land erosion and/or other disturbances that release methane and other greenhouse gases from clathrate deposits.

The system includes an impervious film 1638, such as polyethylene, established over an extensive area of such clathrates to contain and deliver released methane, carbon dioxide, water, and other substances that are released from deposits 1644 in response to the heating of the deposits by the circulation of warmed fluid through a conduit 1640 or delivered by the conduit 1640 from sources such as heat exchanger 1630 in a turbine casing 1642. Alternatively, a pipe or conduit 1636 channels to distribute water-born organic and mineral values from the ocean depths including clathrate deposits to the feeding systems for fish, shrimp, oyster beds, etc.

Suitably cold water from the depths of the ocean and/or from ice and liquid water released from clathrates beneath the film 1638 is delivered to heat exchanger 1630 by pump 1637. After being heated by a suitable heat exchanger, such as the counter current heat exchanger 1630, the warmed water may be further heated by additional heat exchange from working fluids of various energy conversion processes on platform 1603, such as OTEC processes, or returned through return conduit 1632 to the methane hydrate formation beneath the film 1638 at a desired rate to controllably release additional methane that is delivered to the surface platform 1603 for solar, wind or moving water driven energy conversion processes that support thermochemical regeneration to produce carbon and hydrogen from such methane. Additional hydrogen may be produced by similar dissociation of natural gas and/or oil produced by well 1660, which in many cases is from a deep geothermally significant formation 1662, as shown.

Intake 1616 feed ocean water into solar collector 1602. The water vapor produced by the heat gain from the solar collector 1602 and additional heat contributions rejected from solar dissociation of methane or oil as performed by suitable line-focus or point-focus solar concentrators 1610 and from wind generators 1608 mounted for example on platform 1606 and/or by harnessing moving water such as by wave generators 1612, 1650, provides electricity through, for example, line 1604 for induction heating of methane and/or oil to produce hydrogen and carbon. The wave generators 1612, 1650 includes a tube generator assembly to provide buoyancy for tensioning the base cable against anchor 1652. Various types of designer carbon products are produced, including super activated carbon that is collected in tanks and warehouses 1614 for distribution to various markets, including renewable resources industrial parks.

The system 1600 may produce various fertilizers including ammonia or ammonium sulfate, with additions of potassium, phosphorus, iron and various other mineral restoration selections. The hydrogen produced by the processes disclosed as in Equation 9 may be reacted with nitrogen that is collected from the atmosphere by various processes, such as those described in copending applications referenced and incorporated above. Surplus hydrogen combustion in a heat engine eliminates oxygen and produces water that is separated to provide for a reaction of hydrogen and nitrogen to produce ammonia. Equation 12 summarizes such processes of ammonia production:

$$3H_2 + N_2 \rightarrow 2NH_3 \qquad \text{Equation 12}$$

The system may also provide various produced substances to fish hatcheries and farms and to attract wild fish and other desired marine life along with other entities growing organic matter, such as hatcheries 1664-1671. Clathrates such as methane hydrates are warmed to release nutrients including organic substances and trace minerals. Such mineral and organic values are delivered by suitable distribution conduits to nourish oysters, shrimp, various fish selections and so on, from suitable pipes such as shown by pipe 1640.

Thus, the system may utilize various components of an OTEC system, such as a working fluid, as an energy exchange mechanism between various energy sources and generative systems. The integration of a supplemented OTEC system allows for various energy sources to increase the efficiency of operation of the OTEC system, and for the OTEC system, in turn, to increase the efficiency of production of various generative systems.

CONCLUSION

A system providing for the conversion of renewable energy resources into renewable fuels and electricity to serve local and distant markets is described.

While specific embodiments of, and examples for, the system are described above for illustrative purposes, various equivalent modifications are possible within the scope of the system, as those skilled, in the relevant art will recognize. For example, while processes or steps are presented in a given order, alternative embodiments may perform routines having steps in a different order, and some processes or steps may be deleted, moved, added, subdivided, combined, and/or modified to provide alternative or subcombinations. Each of these processes or steps may be implemented in a variety of different ways. Also, while processes or steps are at times shown as being performed in series, these processes or steps may instead be performed in parallel, or may be performed at different times.

From the foregoing, it will be appreciated that specific embodiments of the system have been described herein for purposes of illustration, but that various modifications may be made without deviating from the spirit and scope of the system. Accordingly, the system is not limited except as by the appended claims.

I claim:

1. An ocean thermal energy conversion system, the system comprising:
   a vaporizer configured to receive water from an ocean and vaporize a working fluid using the received water;
   a condenser configured to receive water from an area of the ocean lower than the surface area of the ocean and condense vaporized working fluid;
   a working fluid passageway, coupled to the vaporizer and the condenser, configured to provide the working fluid to the vaporizer and receive the working fluid from the condenser;
   a turbine, coupled to the vaporizer, configured to generate electricity using the vaporized working fluid; and
   a solar collector assembly, coupled to the vaporizer, configured to provide water to the vaporizer at a temperature higher than a temperature of the water of the surface area of the ocean, the solar collector assembly including a channel configured to receive ocean water into the solar collector assembly and hold the received ocean water within the solar collector assembly, a solar energy trapping portion surrounding the channel and configured to heat the received ocean water, the solar energy trapping portion configured to be at least partially filled with a gas having a lower thermal conductivity than air to prevent evaporative cooling of the water and the trapped solar energy, and a coupling portion configured to transport the heated ocean water to an ocean thermal energy conversion system, wherein the solar energy trapping portion is formed of a thin film polymer.

2. The system of claim 1, wherein the solar collector comprises:
   a web assembly configured to trap solar energy; and
   a channel within the web assembly configured to:
     receive the water from the surface area of the ocean;
     warm the water received from the surface area of the ocean; and
     transport the received water to the vaporizer.

3. The system of claim 1, wherein the solar collector comprises:
   a channel configured to hold water received from the surface area of the ocean; and
   an insulated air space at least partially surrounding the channel and configured to capture solar energy in order to raise the temperature of the water held by the channel.

4. The system of claim 1, wherein the solar collector is a spiral shaped solar collector.

5. An ocean thermal energy conversion system, the system comprising:

a heat engine, wherein the heat engine is configured to generate electricity using ocean water; and a solar collector, wherein the solar collector is configured to raise the temperature of ocean water received by a vaporizer of the heat engine, the solar collector including a channel configured to receive ocean water into the solar collector and hold the received ocean water within the solar collector, the solar collector including a pressurized insulating space surrounding the channel; and a device coupled to the solar collector configured to produce and provide pressurized gas to the insulating space.

6. The system of claim 5, wherein the solar collector is configured to provide ocean water to the vaporizer of the heat engine at a temperature higher than the temperature of ocean water surrounding the solar collector.

7. The system of claim 5, wherein the heat engine is configured to heat a working fluid within the heat engine using the ocean water received by the vaporizer of the heat engine.

8. An ocean thermal energy conversion system, the system comprising:

a vaporizer configured to receive water from an ocean and vaporize a working fluid using the received water;

a condenser configured to receive water from an area of the ocean lower than the surface area of the ocean and condense vaporized working fluid;

a working fluid passageway, coupled to the vaporizer and the condenser, configured to provide the working fluid to the vaporizer and receive the working fluid from the condenser;

a turbine, coupled to the vaporizer, configured to generate electricity using the vaporized working fluid; and a solar collector, coupled to the vaporizer, configured to provide water to the vaporizer at a temperature higher than a temperature of the water of the surface area of the ocean, the solar collector including a web assembly configured to trap solar energy and a channel within the web assembly configured to:

receive the water from the surface area of the ocean;

warm the water received from the surface area of the ocean; and transport the received water to the vaporizer, the channel extending between upper and lower walls of the web assembly that form insulating spaces for trapping solar energy and wherein the upper walls are formed with generally transparent materials and the lower walls are formed with generally opaque materials.

9. An ocean thermal energy conversion system, the system comprising:

a vaporizer configured to receive water from an ocean and vaporize a working fluid using the received water;

a condenser configured to receive water from an area of the ocean lower than the surface area of the ocean and condense vaporized working fluid;

a working fluid passageway, coupled to the vaporizer and the condenser, configured to provide the working fluid to the vaporizer and receive the working fluid from the condenser;

a turbine, coupled to the vaporizer, configured to generate electricity using the vaporized working fluid; and a solar collector, coupled to the vaporizer, configured to provide water to the vaporizer at a temperature higher than a temperature of the water of the surface area of the ocean, the solar collector including a channel configured to hold water received from the surface area of the ocean and an insulated air space at least partially surrounding the channel and configured to capture solar energy in order to raise the temperature of the water held by the channel, wherein the insulated air space includes a depression configured to hold at least one of a stiffener and weight for lowering a center of gravity of the solar collector.

10. An ocean thermal energy conversion system, the system comprising:

a vaporizer configured to receive water from an ocean and vaporize a working fluid using the received water;

a condenser configured to receive water from an area of the ocean lower than the surface area of the ocean and condense vaporized working fluid;

a working fluid passageway, coupled to the vaporizer and the condenser, configured to provide the working fluid to the vaporizer and receive the working fluid from the condenser;

a turbine, coupled to the vaporizer, configured to generate electricity using the vaporized working fluid; and a solar collector, coupled to the vaporizer, configured to provide water to the vaporizer at a temperature higher than a temperature of the water of the surface area of the ocean wherein the solar collector is a spiral shaped solar collector, wherein the spiral shaped solar collector includes a polymer netting that extends across the top and bottom of the collector to provide the collector with a self-stabilizing operational feature.

11. The ocean thermal energy conversion system of claim 10 wherein the netting includes tie-lines from the netting that extends across the top of the collector to the netting that extends across the bottom of the collector.

12. The ocean thermal energy conversion system of claim 10 wherein the netting is electrometric.

13. The ocean thermal energy conversion system of claim 10 wherein the solar collector includes both high strength radial cables and circumferential straps for providing additional stabilization.

* * * * *